(12) United States Patent
Myr

(10) Patent No.: US 6,615,130 B2
(45) Date of Patent: *Sep. 2, 2003

(54) REAL TIME VEHICLE GUIDANCE AND TRAFFIC FORECASTING SYSTEM

(75) Inventor: David Myr, Jerusalem (IL)

(73) Assignee: Makor Issues and Rights Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/800,116

(22) Filed: Mar. 6, 2001

(65) Prior Publication Data
US 2001/0029425 A1 Oct. 11, 2001

Related U.S. Application Data

(63) Continuation-in-part of application No. 09/528,134, filed on Mar. 17, 2000.

(51) Int. Cl.$^7$ .............................. G08B 1/09; G08G 1/09; G06F 165/00
(52) U.S. Cl. ...................... 701/117; 701/118; 340/988; 340/989
(58) Field of Search ................................. 701/117, 118, 701/119, 200, 201, 202, 203, 205, 206, 207, 208, 209, 210, 211, 212, 213; 340/988, 989, 990, 991, 993, 995, 996, 905

(56) References Cited

U.S. PATENT DOCUMENTS

| | | | | |
|---|---|---|---|---|
| 4,954,958 A | | 9/1990 | Savage et al. ............... 364/444 |
| 5,187,810 A | * | 2/1993 | Yoneyama et al. ......... 455/34.1 |
| 5,539,645 A | * | 7/1996 | Mandhyan et al. .......... 364/438 |
| 5,543,789 A | * | 8/1996 | Behr et al. ................... 340/995 |
| 5,610,821 A | * | 3/1997 | Gazis et al. ............. 364/444.2 |
| 5,818,356 A | * | 10/1998 | Schuessler .................. 340/995 |
| 5,889,477 A | * | 3/1999 | Fastenrath .................. 340/905 |
| 5,889,671 A | * | 3/1999 | Autermann et al. ........ 364/188 |
| 5,911,773 A | * | 6/1999 | Mutsuga et al. ............ 701/200 |
| 5,919,246 A | * | 7/1999 | Waizmann et al. ......... 701/209 |
| 6,107,944 A | * | 8/2000 | Behr et al. .................. 340/995 |
| 6,150,961 A | * | 11/2000 | Alewine et al. ............ 340/995 |
| 6,169,515 B1 | * | 1/2001 | Mannings et al. ....... 342/357.1 |
| 6,253,146 B1 | * | 6/2001 | Hanson et al. .............. 701/202 |
| 6,314,360 B1 | * | 11/2001 | Becker ....................... 701/117 |

FOREIGN PATENT DOCUMENTS

| | | |
|---|---|---|
| DE | 195 47 574 A1 | 10/1996 |
| EP | 0 903 916 A2 | 3/1999 |
| FR | 2 762 906 | 11/1998 |
| WO | WO 95/21435 | 8/1995 |
| WO | WO 98/27525 | 6/1998 |

* cited by examiner

Primary Examiner—Tan Q. Nguyen
Assistant Examiner—Dalena Tran
(74) Attorney, Agent, or Firm—Stanley N. Protigal; Elman Technology Law, P.C.

(57) ABSTRACT

Real time vehicle guidance by central traffic unit is provided by a system which includes a central traffic unit, a plurality of vehicles equipped with mobile guidance units, and communication system based on GSM/GPS technology. The central traffic unit maintains the perpetually updated database of travel times for all sections of roads, while mobile guidance units include mobile cell phone handset units communicatively linked to the central traffic unit computer server. Mobile guidance units also comprise smart card capable to detect when a mobile cell phone unit is located in the mounting receptacle. To detect a bottleneck situation when it arises and to estimate a current travel time for a corresponding section of road, the central traffic unit maintains a list of probe vehicles that have recently exited that section. If the times those vehicles have spent on the section differ considerably from a regular travel time stored in the database, the central traffic unit uses statistical tools for forecasting the future travel time along this section. By appropriately combining those travel times, the central traffic unit calculates the fastest route based on the most updated information on traffic load disposition. The guidance system also allows the driver to enter alternative time schedules for the same destination and receive alternative travel time estimates reflecting different estimated travel times along the roads at different times.

21 Claims, 24 Drawing Sheets

REAL TIME VEHICLE GUIDANCE AND TRAFFIC FORECASTING SYSTEM

CROSS REFERENCE TO RELATED APPLICATION

This application is a continuation-in-part of U.S. patent application Ser. No. 09/528,134, filed Mar. 17, 2000.

BACKGROUND OF THE INVENTION

1. Field of the Invention

This invention relates to communications and statistical analysis of vehicle movement. More particularly, the invention relates to communication with vehicles for the purpose of supplying traffic condition information and analyzing data relating to traffic conditions.

2. Description of Related Art

Conventional on-vehicle guidance systems are usually stand-alone applications wherein the traffic data are static and cannot be easily dynamically updated. Consequently, the proposed routes are accurate only under ideal traffic conditions. The stand-alone versions cannot take into account current traffic jam conditions or real time emergencies. Hence, even when a so-called "optimal route" is found, it may not be usable solution in real time situations and can only be used as a general recommendation. Other systems rely on electronic and optical sensors situated at various key locations to measure and update the current traffic loads. These systems are typically costly to install and to maintain and to be effective they must be distributed over large sectors of roads. Still other real time traffic control systems utilize real time field information typically gathered from various service vehicles such as traffic police, ambulances, road maintenance teams, etc., which is usually transmitted by radio to the control center and from there broadcasted to the public.

Use of a database for determining traffic jams and other bottleneck situations is addressed in U.S. Pat. No. 5,699,056. Data is obtained from traveling vehicles, including their IDs, positions, times, and speeds. A jam is presumed if an average speed of a block of vehicles is less than a predetermined value. This arrangement requires that data concerning relevant conditions of a large number of road sections be provided. The prior art requires evaluation of vehicle speeds and averaging them over a block. This seemingly innocuous operation may highly problematic, however, within a traffic jam as many if not all speed measurements may return zero values. In other words, speed as a function of time may be wildly discontinuous and measuring it on time grid of a minute may prove highly inaccurate. The definition of blocks is not quite clear. No technique is given for partitioning the vehicles into blocks. The number of roads or more precisely, sections of roads may be very large, say, tens of thousands. It may be difficult to cover them all, i.e. store all the relevant data, process and update it on-line. An important point in his solution is evaluating vehicle speeds and averaging them over a block. This seemingly innocuous operation may highly problematic; however, within a traffic jam as many if not all speed measurements may return zero values. In other words, speed as a function of time may be wildly discontinuous and measuring it on time grid of a minute may prove highly inaccurate.

Koutsopoulos and Xu's paper is theoretical, and uses mathematical techniques and computer simulations for studying various methods of predicting future travel times under conditions of traffic congestion. Their results are interesting but they cover a tiny simulation model under a number of assumptions which may or may not be valid in large scale systems.

A comprehensive and obviously expensive experimental project ADVANCE is described in a series of technical reports obtainable at the Web site http://jungle.dis.anl.gov/advance. Many of their algorithmic decisions appear to be similar though not identical to ours while some of the most significant differences may be summarized as follows. They used "pure" GPS technology coupled with RF transmitters for transmitting location information from the equipped vehicles to the base station. Their fleet of equipped vehicles was extremely small (about 80 cars) and experimental. As opposed to this, we propose to utilize the GSM/GPS technology available from a number of telecommunications operators and quickly becoming an industry standard. As a result, our fleet of vehicles is going to be limitless for all practical purposes. Furthermore, in ADVANCE all route planning was performed in vehicles which necessitated maintenance of updated databases in all vehicles. In our system, all planning is done at the central server which greatly facilitates system's functioning and makes vehicles's equipment simpler and less costly.

Other proposed methods and systems for determination of dynamic traffic information and traffic events use wide coverage mobile telephone network such as GSM or CDMA. For example, U.S. Pat. No. 6,012,012 utilizes manual or remote interrogation system for storing location and other traffic related behavior and then transmit it by radio broadcast or mobile telephone system to the terminals of road users. However, this information is presented to the users in audio, visual or graphic means, and no attempt is made to provide alternative routes or navigation instructions based on this information.

SUMMARY OF THE INVENTION

The present invention contains the vehicle guidance system consisting of a plurality of vehicles equipped with MGUs, the CTU, and a communication system provided by the telecommunication service provider. By utilizing GSM/GPS technology, or GSM technology, or other wireless technology, the CTU tracks the positions of MGUs and updates in real time the database of travel times for all roads. In response to a request from a driver for a route update from his present position to a desired destination, it calculates the desired fastest route by utilizing both the regular travel times along segments of roads and predicted current travel times found by using information collected from tracking routines. Thereafter, the route is communicated to the driver. In addition to GSM it is contemplated that CDMA and other mobile telecommunications formats will be used.

The present invention, provides a real time vehicle guidance system is capable of providing optimal route from the present position of a vehicle to a desired target destination when traffic jams may be present. This reduces the burden upon the driver when the vehicle is traveling at high speeds on unfamiliar roads. Thereafter the optimal route found is communicated to the driver and displayed on the vehicle's computer screen featuring the digital map of the relevant region and/or via audio instructions.

The travel time between two road intersections A and B is the sum of travel times for all sections of roads connecting A and B on the shortest route either by the minimal time criterion, or by some other criterion. Then in order to be able to compute a travel time between two positions on a map, we must be able to determine travel times for all sections of roads connecting those positions, or road intersections close to them. In the standard solution (an autonomous or stand-alone on-vehicle application), a route is computed by a mathematical optimization algorithm while travel times are computed as distances divided by maximal allowed speeds. While being simple, such solutions have an obvious shortcoming in that they do not take into account the real conditions on the roads and therefore can serve only as a guidance suggestion.

According to one embodiment of the present invention, a true real time system is provided which collect, store and make use of the following kinds of data:

1. Temporary changes in road conditions known in advance like closed roads under construction, traffic reroutes, etc.;
2. Regular predictable changes like everyday slowdowns in rush hours;
3. Sudden unpredictable changes such traffic accidents, traffic congestion due to sudden and drastic changes in traffic arrangements because of visiting dignitaries, etc.

The system in the present invention is built around an idea of collecting and processing information that describes all those changing conditions.

The guidance system according to the present invention consists of CTU and a fleet of MGUs, i.e., traveling vehicles with mobile phones connected to the communication system. Each traveling vehicle may function both as a probe vehicle and as a client vehicle. When a phone handset unit is located in the mounting receptacle, the vehicle functions as a probe vehicle for data collection. This data collection is performed by permanent monitoring of vehicle positions by means of GSM/GPS or other wireless technology while vehicles are in motion and by concurrent measuring of their current travel times along a broad range of roads.

One goal of the invention is to provide a real time travel guidance system capable of handling a driver's request for a fastest route to any destination. At any point of the journey the driver can enter a request for alternative route and will receive an updated route reflecting the real time traffic situation directly on his display panel. The information will also be updated by visual and audio instructions, and driver's vehicle position will be displayed on the display unit.

Another goal is to provide the driver with a tool for strategic trip planning. By entering alternate times for future trips and comparing their travel time estimates for the same destination, the driver receives an option to select a trip proposal ideally suited for his needs.

DETAILED DESCRIPTION OF THE INVENTION

A major goal of the invention is to provide a real time travel Guidance System capable of handling a driver's request for a fastest route to any destination. At any point of the journey the driver can enter a request for alternative route and will receive an updated route reflecting the real time traffic situation directly on his display panel. The information will also be updated by visual and audio instructions, and driver's vehicle position will be displayed on the display unit.

Another goal is to provide the driver with a tool for strategic trip planning. By entering alternate times for future trips and comparing their travel time estimates for the same destination, the driver receives an option to select a trip proposal ideally suited for his needs.

Figure 1:
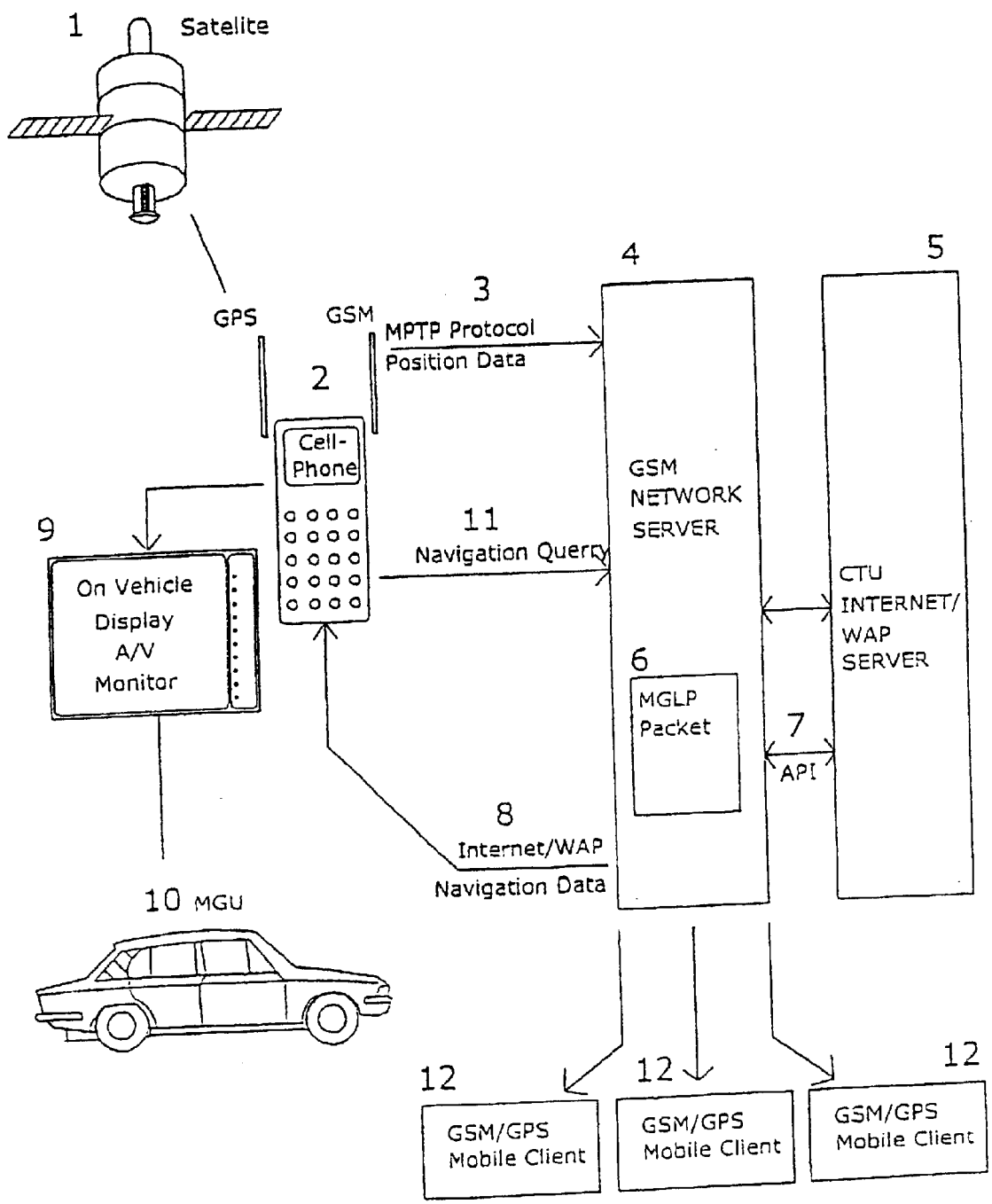
FIG. 1 shows information exchange in the guidance system.

The subsequent description of the Guidance System is divided into the following parts:

1. Information exchange in the Guidance System
2. Algorithm for processing user's request
3. Vehicle's display
4. Two categories of roads
5. Information zones; updating planned routes in CTU
6. Travel times data
7. General description of CTU database
8. Maximum feasible precision in determining MGU positions
9. Theoretical travel times
10. Regular empirical travel times
11. Current travel times
12. Computation of optimal routes FIG. 1 is a schematic representation of the information exchange between CTU, MGUs and a GSM network server in a guidance system. In addition to GSM it is contemplated that CDMA and other mobile telecommunications formats will be used. It represents client vehicles equipped with hybrid GSM/GPS positioning devices automatically receiving the satellite (Unit 1) GPS data, communicating it to CTU Server (Unit 5), and using existing GSM Network Service (Unit 4). The vehicle's real time position data containing the present position, the observation time, and vehicle's ID are transmitted via separate mobile phone telematics protocol (MPTP, Unit 3) at preset time intervals. Location data from all signal vehicles are temporarily stored on The GSM network server (Unit 4) in a multiple-GPS locator packet (MGLP, Unit 6). The CTU Server accesses the MGLP on the network server via automatic packet interrogation (API, Unit 7) process. After processing the information, CTU updates its database. At any given moment, the CTU also maintains the database containing travel times for all sections of roads at a particular time of the day, for a particular of day of the week, etc. Initially, those travel times are theoretical travel times but as the time goes by and observational data are being collected and processed, they are replaced by regular (empirical) travel times reflecting realistic travel conditions, and on particular occasions by current travel times, which reflect sudden and unpredictable changes in traffic conditions.

On receiving a navigation query (Unit 11) from a GSM Network driver/subscriber for a shortest route to a particular destination, the CTU applies an optimization procedure for computing an optimal route while making use of updated travel times for individual sections of roads. Thereafter, the optimal route is communicated to the MGU (Unit 10) via Internet/WAP protocol (Unit 8) and presented to the driver visually on the MGUs monitor (Unit 9) configuration in digital map format, and/or in audio form through a sequence of voice instructions to GSM mobile clients (Unit 12). Below is the list of the major functions performed by the guidance system.

Major functions of the guidance system include:
1. Receiving multiple-GPS locator packet (MGLP) location data from traveling vehicles via the GSM network server through packet interrogation process;
2. Processing those data and storing them in the CTU database;
3. Managing (processing and storing) theoretical travel times;
4. Managing (processing, storing and updating) regular or statistical travel times;
5. Managing (processing, storing and updating) current travel times;
6. Maintaining and updating digital geographical maps of all roads;
7. Managing zoning information;
8. Managing individual query communication via Internet/WAP server;
9. Interaction with Administrator (human operator).

The MGU functions include:
1. Using smart card for detecting when a phone handset unit is located in the mounting receptacle;
2. Utilizing a combination of phone and voice recognition technology in WAP environment for receiving and processing driver's navigation request;
3. Communicating driver's navigation request to CTU;
4. Receiving the calculated shortest route from CTU and translating it into appropriate form for displaying it on the computer screen and communicating it to the driver in audio form;
5. Processing additional driver's requests.

The communications system functions include:
1. Utilizing GSM/GPS or other wireless technology for providing reliable connection among the CTU, telecommunications operator stations, and MGUs;
2. Transmitting GSM/GPS location data from MGUs to CTU via telecommunications service operator stations when relevant handset units are located in the mounting receptacles;
3. Assigning priority to subscriber mobile user communication over signalling telematic data;
4. Transmitting client requests for a fastest route from a given location to a desired destination from MGUs to CTU;
5. Transmitting appropriately coded information on calculated routes from CTU to MGUs via internet/WAP Server.

The subsequent description of the guidance system is divided into the following parts:
1. Information exchange in the guidance system
2. Algorithm for processing user's request
3. Vehicle's display
4. Two categories of roads
5. Information zones: updating planned routes in CTU
6. Travel times data
7. CTU database
8. Maximum feasible precision in determining MGU positions
9. Theoretical travel times
10. Regular empirical travel times
11. Current travel times
12. Computation of optimal routes
13. Entertainment and security related applications
14. Online traffic accidents and weather reports The Guidance System comprises the Central Traffic Unit (CTU), Mobile Guidance Units (MGU), and the communication System (COS).

Figure 2:
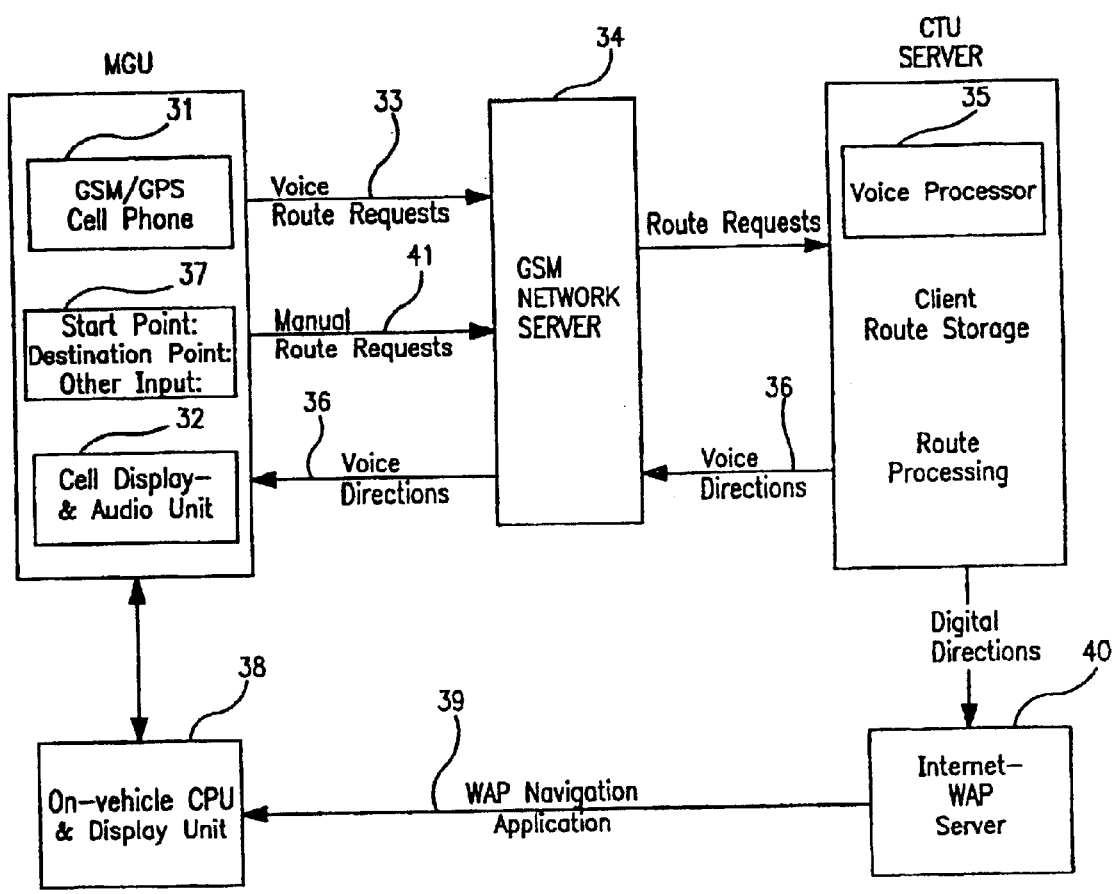
FIG. 2 shows request processing loop in the guidance system.

FIG. 1 is a schematic representation of the information exchange between CTU, MGUs and the GSM Network Server in the Guidance System as described in detail in the Brief Description in the Overview of the Guidance System. The CTU is configured to utilize GSM/GPS or other wireless technology for receiving location data from a fleet of moving vehicles equipped with MGUs that are traveling and thereby passively collecting sample traffic congestion data along a broad range of road systems. Location data are temporarily stored on GSM Network Server in Multiple-GPS Locator Packet (MGLP). The CTU Server accesses the MGLP data on Network Server via Automatic Packet Interrogation process and stores the relevant information. The CTU processes these location data, converts them into travel time data, and stores them in the database to be later used as regular travel time data and current travel time data. Those data will be used for calculating fastest routes for the clients. The COS function is to provide reliable connection among the CTU, telecommunications operator stations, and MGUs. Initially, the COS must identify and process relevant GSM/GPS data when the corresponding handset units are located in the mounting receptacles of the travelling vehicles. The receptacles are controlled and accessed by a built-in Smart card located in the vehicle. This card initiates the GSM Network communication using hybrid GSM/GPS positioning devices and communicating their GPS positions to CTU Server at preset time intervals. The vehicle's real time position data are transmitted via separate Mobile Phone Telematics Protocol (MPTP) and contain relevant location data; the present position, the position time, and their IDs. The MTPT protocol does not interfere with the regular mobile user communication, and the COS manages and channels the Signalling Telematic location data from all signaling cell phones/vehicles. COS also manages all client requests for fastest route alternatives from a given location to a desired destination. Several possible configurations of communication modes are presented in FIG. 2: basic configuration with cell phone exclusively 31 and PC handheld with additional storage memory 32. The GSM client using a cell phone 31 may enter his navigation query via voice service 33 to the GSM network service 34 and CTU automatic voice processor 35. In return, COS passes the travel navigation instructions from the CTU to the client also via the GSM/GPS telecommunication system 36 in form of series of voice commands. Where the manual input is available on the cell unit 41, the client may also enter the SP and DP manually 37. In the mobile PC Client MGU or other handheld configuration 39, the request is transmitted by means of standard navigational query selection process in a PC Internet/WAP software application 38 and transmitted via GSM telecommunication network to Internet/WAP server 40. Internet Server maintains database and can process all individual requests in real time. Calculated route is then transferred via Internet/WAP application code to the user. Due to the size limitations of the cell-phone LCD displays, it will be desirable to provide an independent on-vehicle A\V color monitor with full connection capabilities to the cell-phone. The navigation directions will be also be returned via TCP/IP protocol in form of digital map and driving Text/Voice instructions. All potential clients and trip planners including usual WEB users can access the online Guidance System via Internet browsers. These WEB users could receive the shortest path solution by entering the origin SP and destination DP points. The real time guidance could be made available in number of geographical regions depending on distribution and availability of signaling vehicles in that region.

In regions, where the real time jam information is temporarily not available, the user could still receive the shortest route based on statistical traffic data. COS also enables other transmission capability for GSM such as General Packet Radio Services (GPRS). MGUs can benefit from high-bandwidth data traffic without having to wait for the phone to dial, as they do with a circuit switched call. Full time connectivity is ideal for navigational data access and information transmission with Internet-type networks based on TCP/IP protocol. The GPRS protocol is more common in a dedicated intranet navigational environment. Further details on the GPRS protocol may be found in Patent Refinements section.

Figure 3:
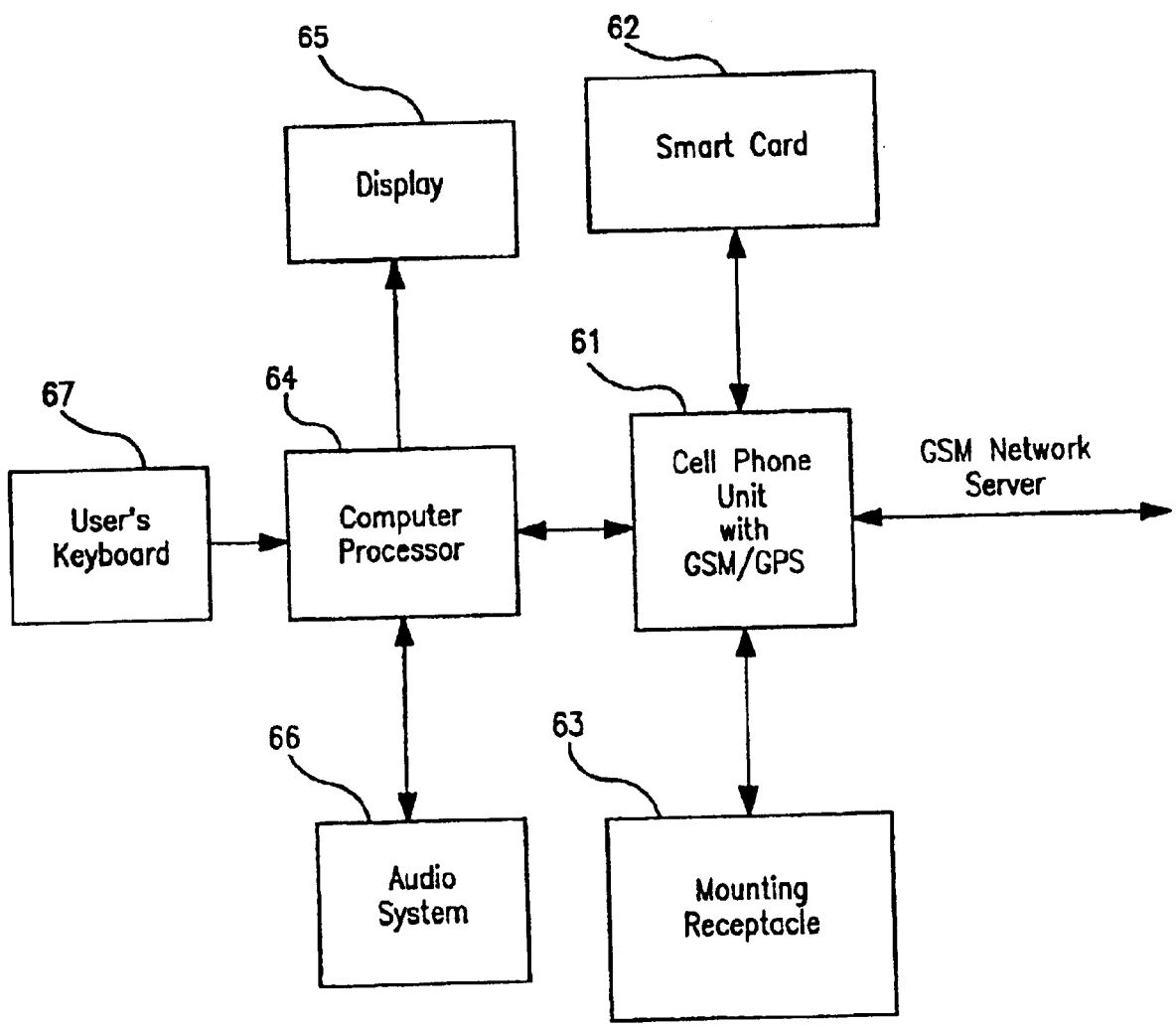
FIG. 3 shows major components of MGU with CPU configuration.

FIG. 3 shows the major components of the MGU with CPU configuration. 61 shows the cell phone handset unit equipped with GSM/GPS antenna capable of transmitting location data to GSM Network Server. The handset unit may or may not be located in the mounting receptacle in 63. The function of the smart card in 62 is to detect when the handset is indeed located in the mounting receptacle and can begin to report the vehicle positions to the CTU. In this configuration the handset unit is connected to on-vehicle computer CPU in 64. The computer stores all the navigation instructions received from CTU. The instructions are displayed on the display 65 and communicated by voice through audio system in 66. The driver can enter all navigation queries and additional requests via keyboard 67, or optionally by voice commands through audio system 66.

Figure 4:
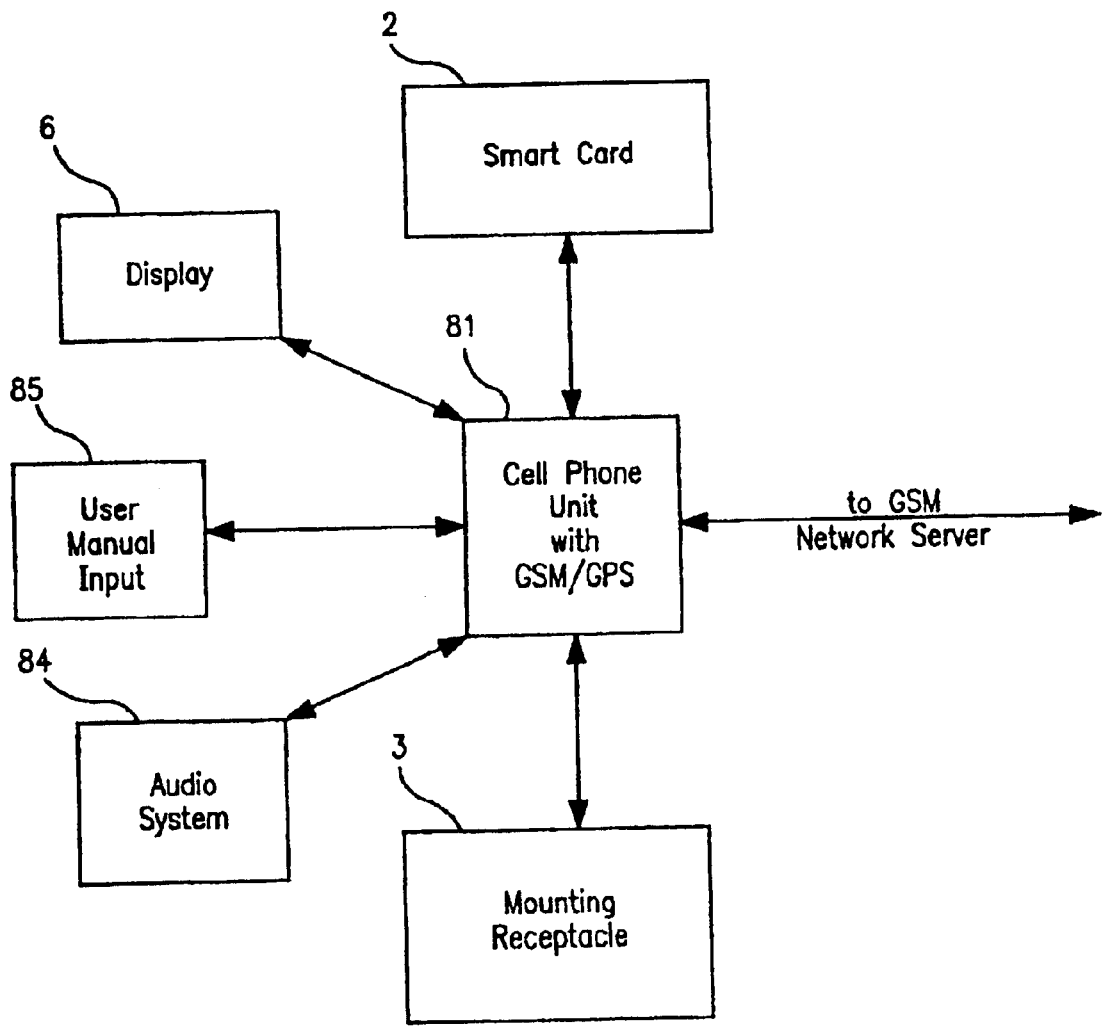
FIG. 4 shows major components of MGU with cell phone configuration.

FIG. 4 shows the major components of the MGU with cell phone GPS/GSM configuration. In this configuration the cell phone 81 can still function both as GPS location data transmitter as well as a user communication device. The user can enter navigation queries via the cell phone input buttons 85 or by voice commands 84 directly to the CTU server. However, the amount of navigation information data that the user can receive concurrently is more limited unless the cell unit is connected online to the Internet/WAP server. It should be noted that in this configuration GPS capabilities are an advantage but not absolutely necessary for navigational directions and the user can enter his or her queries including the starting position by voice to CTU.

Figure 8:
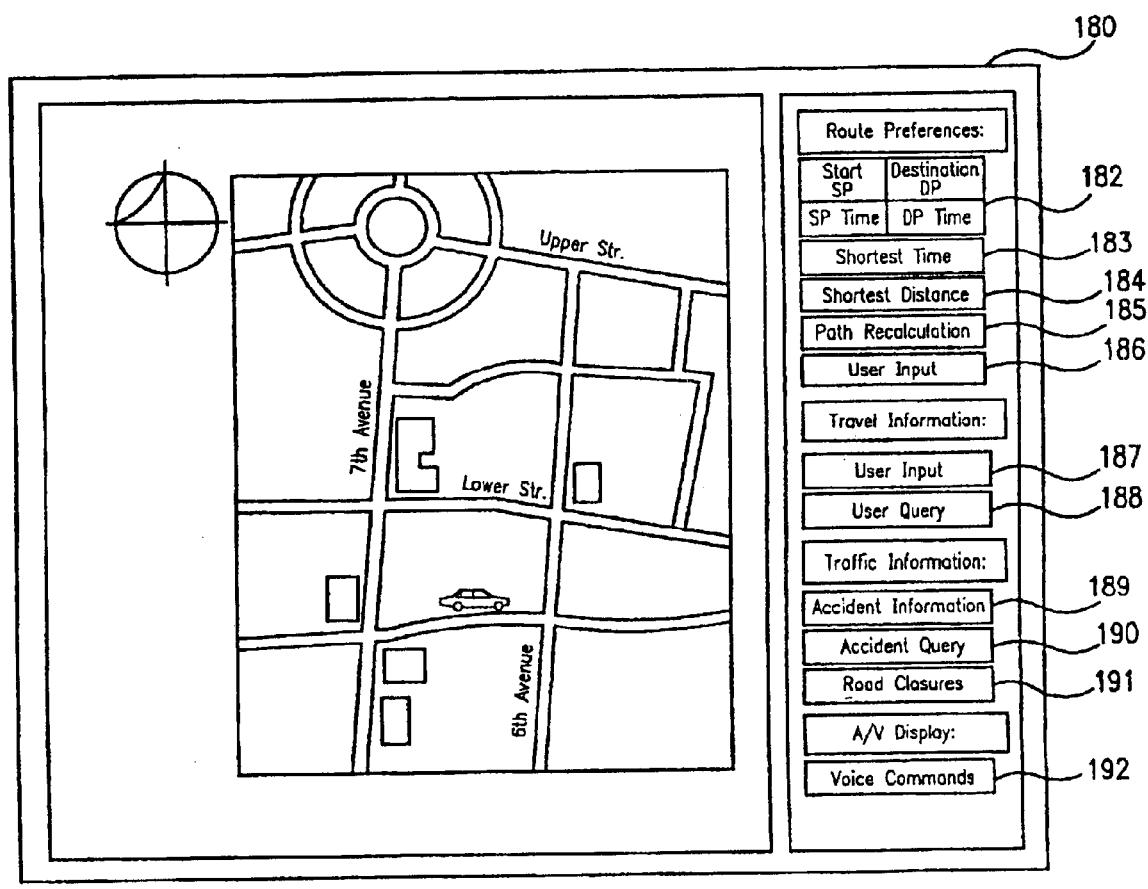
FIG. 8 is a view of the MGU mobile PC display panel according to a preferred embodiment of the present invention.

FIG. 8 illustrates the functions of MGU's mobile PC Display Panel (Unit 1). In the preferred embodiment the display unit is color CRT or a touch screen color display device easily accessible to the driver. The travel maps received from CTU are displayed on the screen and the present vehicle location can be observed on the map. The driver enters the starting point SP and the desired destination point DP in Unit 2 and may specify route preferences by selecting the shortest Travel Time (option 3) or shortest Travel Distance (option 4). Additionally, the user may also enter preferred travel route by selecting specific roads (option 6) and receive automatic path recalculation (option 5). Route requests can also be obtained via voice commands decoder in the audio controller Unit 12. When the desired optimal path is received from the CTU, the driver is notified by audio Unit 12 from the speaker, and simultaneously receives the updated path on the screen. He will be able to record any unusual or sudden traffic problems locally on MGU input (Unit 7) and in addition may enter any items of interest such as various entertainment and shopping locations connected to his travel route and accessed in future by simple query in Unit 8.

Figure 5:
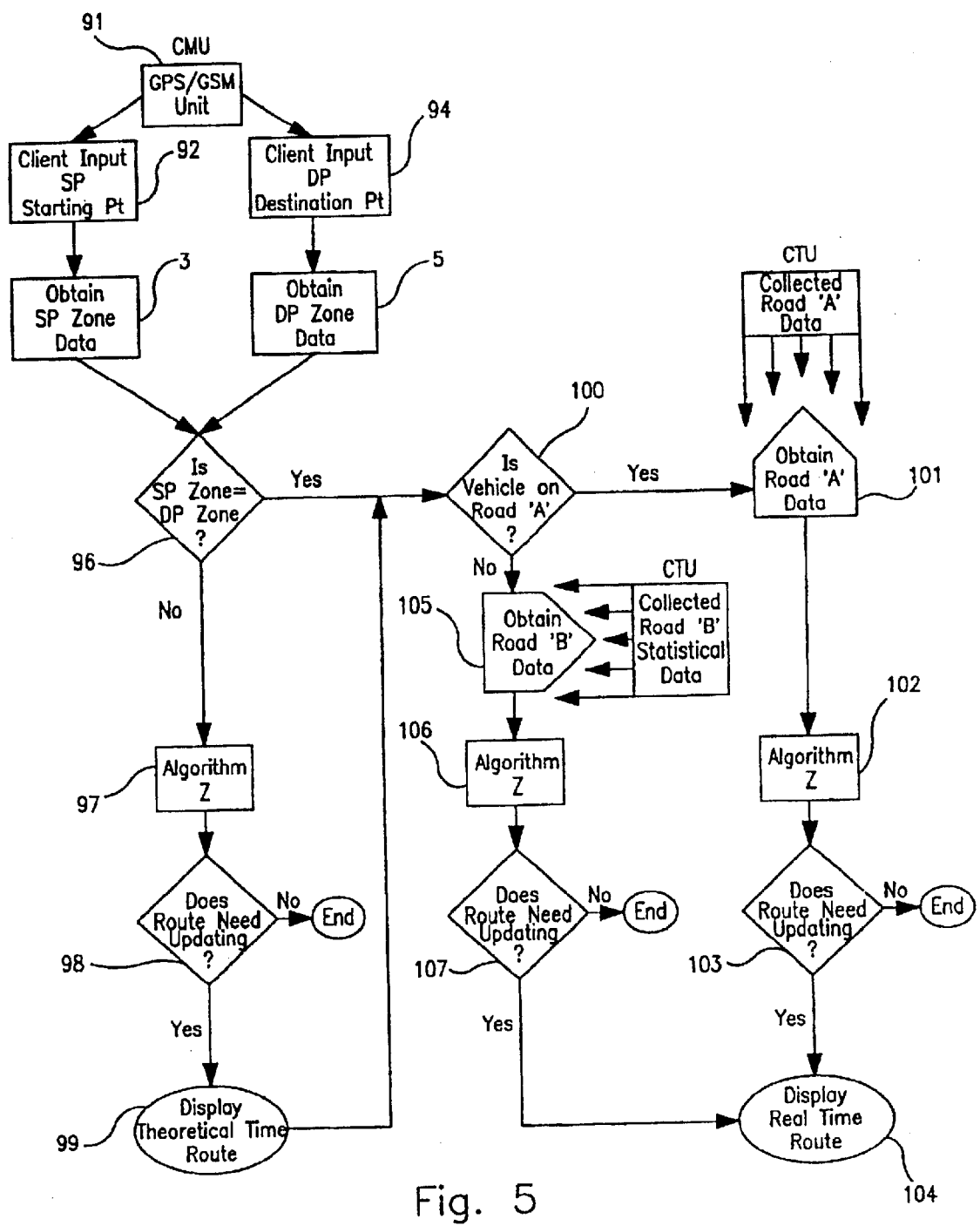
FIG. 5 is a flowchart of major client service functions of the guidance system.

Major client service functions of the guidance system are illustrated by the flowchart in FIG. 5. The client is required to enter the destination point DP (block 94) via cell phone handset unit (block 91) and optionally the desired starting point SP (block 92). For each SP and DP, specific zones of predetermined sizes are assigned by CTU to points SP and DP and called SP zone and DP zone respectively (blocks 3 and 5).

In order to determine if the current time information is available along the travel route, it is necessary to locate both SP zone and DP zone relative to the proposed travel route. If the two zones are not identical, i.e., the point DP is not located in the SP zone, it is assumed that only SP zone current time updates are be relevant to route calculations (block 96). Anymore real data at this point will only slow the calculation process. In block 97, algorithm Z is used to calculate the shortest travel route using theoretical travel times only. If the proposed route differs from the previously calculated stored route (block 98), it is displayed on the display as the theoretical travel time route (block 99). This is to emphasize the difference between the real time travel route and the default theoretical travel time route. The application now proceeds to produce shortest travel route in SP zone only. If the SP is located on a category A road (block 100), the most recent current travel times data for the given SP in zone 8 will be used in route recalculation step (block 101). In block 102, algorithm Z is used to calculate the shortest travel route using current travel times. Again, the newly calculated route is compared to the stored version (block 103) and the updated route in SP zone is displayed as real time travel route. In the event, that the SP is not located on a category A road (block 100), it is updated on category B road table (block 105) as described in Regular Empirical Travel Times below. In block 106 algorithm Z is used to calculate the shortest travel route using category B road data. If the proposed route differs from the previously stored route (block 107), it is displayed on the display as real time travel route (block 104). It should be noted, that this displayed route would likely differ from the theoretical travel time route in (block 99) in that it will reflect the collected statistical data for the SP zone. Similarly, in block 6, if the SP zone is identical to the DP zone, i.e., the desired destination point DP is inside SP zone, the application will immediately proceed to block 100), until display as real time travel route (block 104).

Algorithm for Processing User's Request

Figure 6:
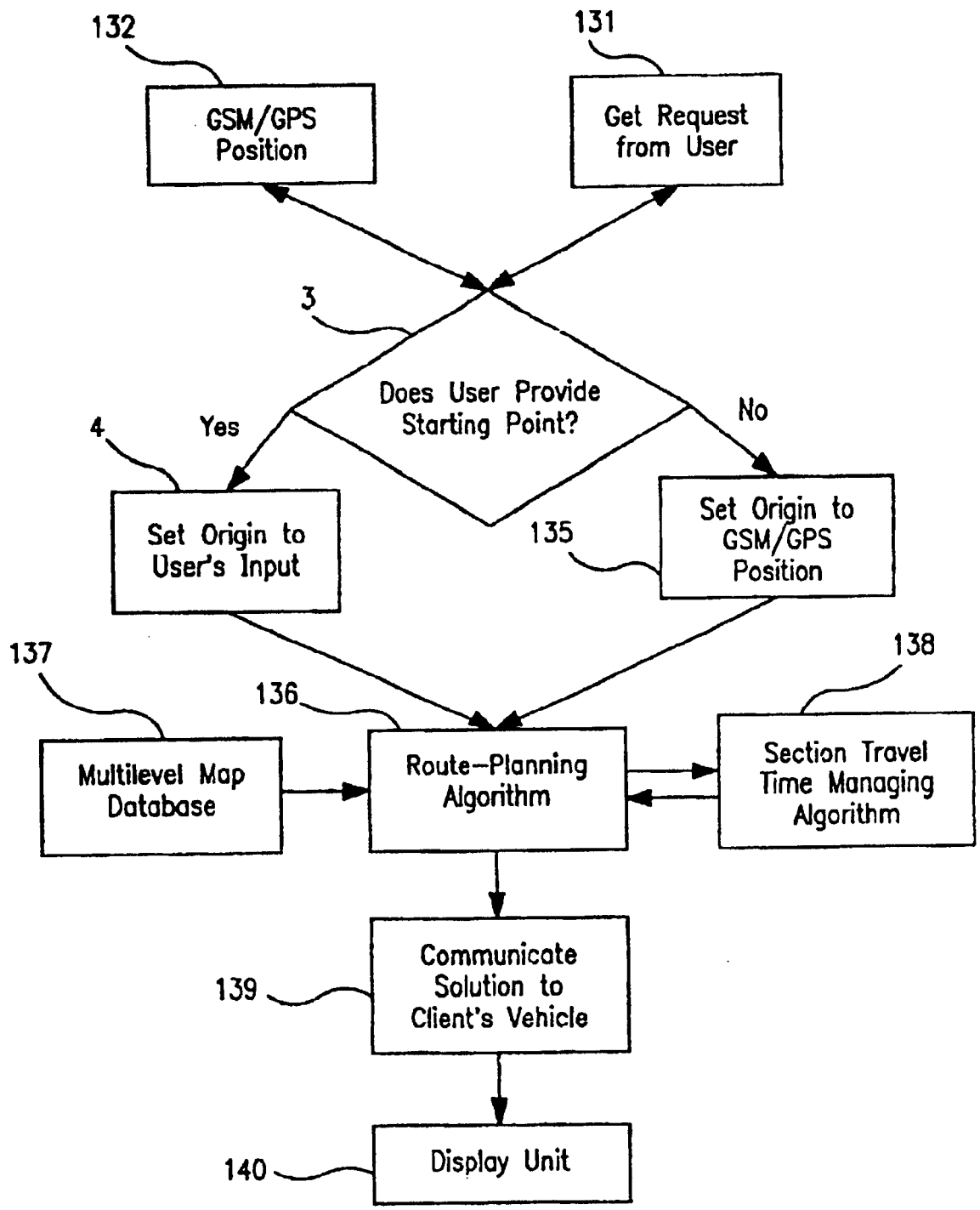
FIG. 6 is an algorithm for processing user's request.

The guidance system begins processing user's request for an optimal route, as shown in FIG. 6, block 131 by looking at destination point DP received from the user. For the vehicle's origin point SP, the application uses the default of the current vehicle position in block 135 as obtained by GSM/GPS in block 132 unless otherwise specified by the user (blocks 3 and 4). In block 136, the route-planning algorithm calculates the optimal route while using multilevel map database (block 137), requesting travel times for various sections from the section travel time managing algorithm in block 138 (see details in FIG. 7), and using the returned section travel times for further processing. In block 139, the shortest route calculated in block 136 is communicated to the user via the communications system, and in block 140 is displayed on the display unit (signs to be shown on a map and/or audio directions).

Vehicle's Display

The vehicle's display is an MGU mobile PC display panel. FIG. 8 is a view of the layout of a CMU display panel 180 according to a preferred embodiment of the present invention. A screen display includes a localised map display 181. Text displays include Route Preference information including start and destination information 182, Shortest Time estimate 183, Shortest Distance estimate 184, Path Recalculation data 185 and User Input data 186. Text displays for Travel Information include User Input 187 and User Query 188. Further text information under the category Traffic Information includes Accident Information 189, Accident Query 190 and Road Closures 191. Audio/Video display information includes Voice Commands 192 and Channel Selection data 193. The above are exemplary in nature and the displays can be changed or customised as desired by the manufacturer and user, and according to the information specified by the user.

In the preferred embodiment the MGU's mobile PC Display Panel 181 is color CRT or a touch screen color display device easily accessible to the driver. The travel maps received from CTU are displayed on the screen 181 and the present vehicle location can be observed on the map. The driver enters the starting point SP and the desired destination point DP at 182 and may specify route preferences by selecting the shortest Travel Time 183 or shortest Travel Distance 184. Additionally, the user may also enter preferred travel route by selecting specific roads 186 and receive automatic path recalculation 185. Route requests can also be obtained via voice commands decoder in the audio unit 192. When the desired optimal path is received from the CTU, the driver is notified by audio unit 192 from the speaker, and simultaneously receives the updated path on the screen. He will be able to record any unusual or sudden traffic problems locally on MGU input 187 and in addition may enter any items of interest such as various entertainment and shopping locations connected to his travel route and accessed in future by simple query 188. In addition, the driver may receive both audio and visual summary of all traffic situations and slowdowns 189-101 in the particular zone he is traveling in, all in real time.

Two Categories of Roads

It appears practically impossible to collect, store and update information on all sections of roads even in a moderately large area where the numbers may run into hundreds of thousands or even millions, so the present invention proposes a division of all roads in a given geographical area into two basic road categories: A and B. Category A consists of all main roads according to the following criteria:

1. Roads that connect important geographical or administrative locations;
2. Roads that carry large volumes of traffic;
3. Roads that are long enough to enable real time monitoring through MGUs Category B Contains All Roads Not in Category A.

When a vehicle is traveling along a road in category A, it is supposed to communicate its location coordinates enough times to allow for accurate estimation of the travel time for that specific road within a given time period. It is expected that doing real time traffic monitoring on the roads in category A alone will help to keep the volume of relevant calculations under control. It should be noted that the division of roads into categories A and B might not exactly correspond to the conventional classification into types such as interstate highways, state highways, etc. It is only being done for the use in data processing and constitutes an important part of preliminary database tuning.

Figure 9:
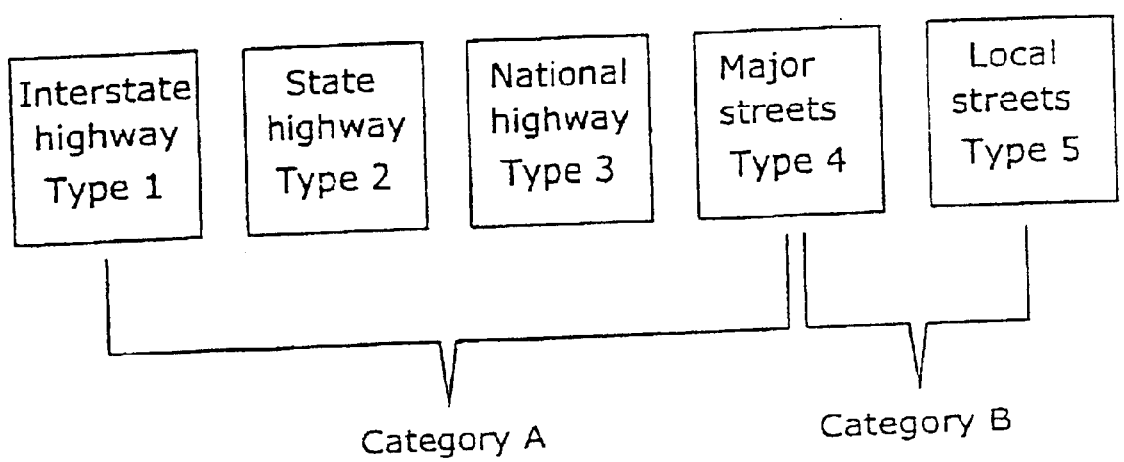
FIG. 9 is the road type classification.
Figure 10:
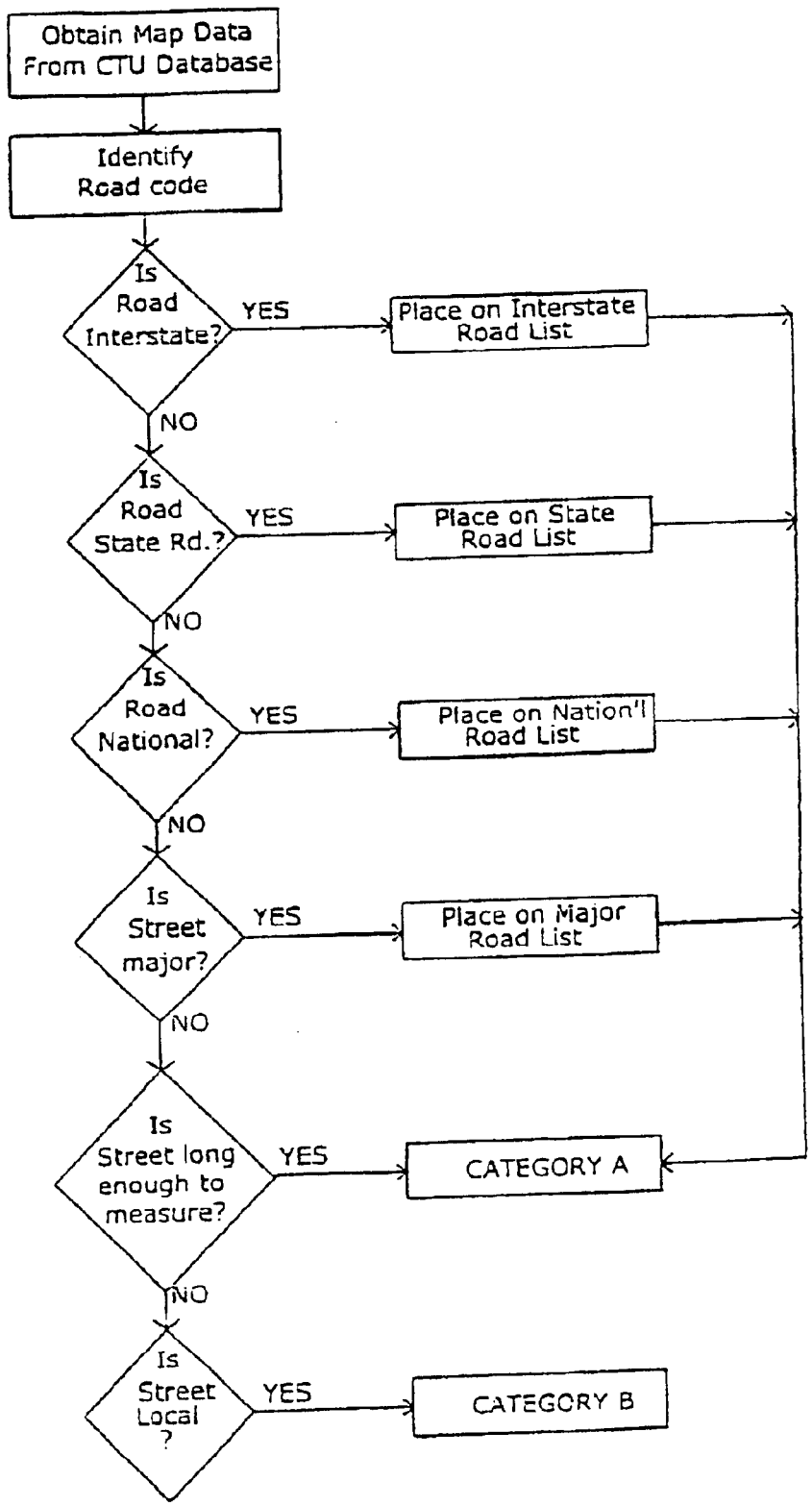
FIG. 10 is road classification flowchart.

A straightforward method to make this division may be based on conventional road types. For example, interstate highways, state highways, national roads and some major streets might be grouped into category A, with the remaining ones into the category B. FIG. 9 shows a flowchart of Road Type Classification based on a conventional road map. Each road is identified according to its type and code such as Interstate, State, and National codes, and is as processed according the above-mentioned criteria. Accordingly, each road is grouped into category A or category B as appropriate. An algorithm for doing this is shown in FIG. 10. In this manner a list of all A roads is created before the traffic volume coefficients in category A roads can be assigned. It should be noted that many roads may be further subdivided into smaller road sections and recorded separately with their individual origin point and endpoint coordinates, as well as the section ID, name, length, etc.

A more sophisticated division could be done by a more complex classification algorithm that performs classification based on type, maximum allowed speed, road length, road width, average traffic volume, registered average traffic volume (if available). Such an algorithm will have an obvious advantage of being able to perform automatic classification. Its apparent disadvantage is that it may still not satisfy some of the criteria outlined above. Furthermore, experience gained in utilizing the guidance system for some time may show desirability of including additional roads into category A, or moving others into category B. As an example, consider an average traffic volume which is an important factor in classifying a road into category A or B. This factor may be unavailable at the beginning of the guidance system functioning, and moreover, it may be changing over time. However, after the guidance system has been operative for a period of time, and enough statistical data on traffic loads has been collected, we can introduce corrections into original subdivision of roads into categories A and B. Therefore, it appears unwarranted to try to rely solely on automatic classification, and a possibility of human intervention should be provided for at all stages of the guidance system functioning.

Information Zones: Updating Planned Routes in CTU

In the present Embodiment, all updates of proposed routes are done on both statistical (empirical) travel times and current travel times. It appears, however, that such updating made on a global scale may not be practical. Consider an example. A driver presently situated in Jerusalem requests a route through Haifa. Obviously, present traffic jams in Jerusalem may be relevant while planning a route while those existing presently in Haifa are not since the traffic situation in Haifa is subject to change by the time the driver arrives there. On the other hand, by the time the driver arrives in the neighborhoods of Haifa, the traffic jams there if any, may become relevant for recalculating of the route. Therefore, it seems logical while planning a route to use different travel times in different locations, in particular, to use current travel times in the vicinity of the present position of a vehicle, and at the same time to use statistical travel times elsewhere.

Figure 11:
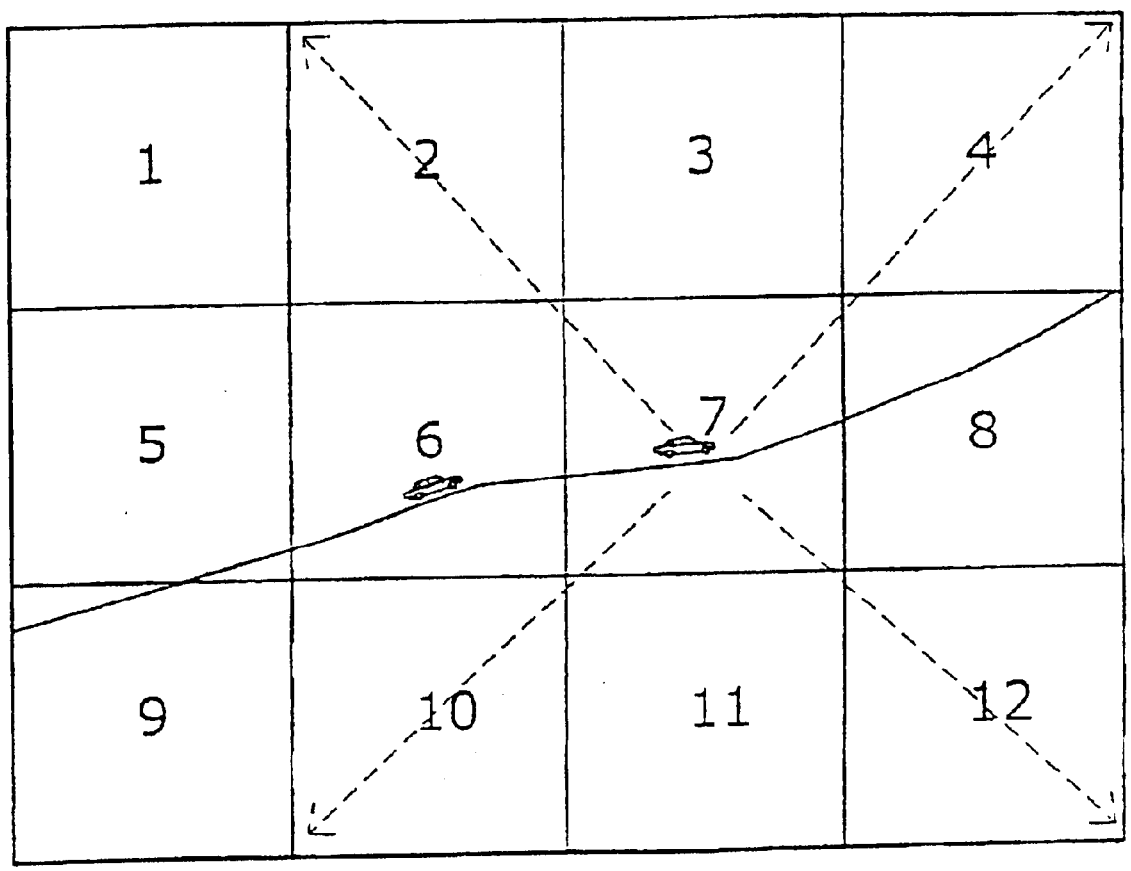
FIG. 11 shows information zones: updating planned routes in CTU

A large geographic area may be subdivided into a set number of subregions, a simple division consisting of squares in a regular grid. The size and division of the grid is predetermined by a number of criteria such as road density and average volume of traffic. A zone may be defined as a group of squares put together for a particular task. In particular, a zone of nine contiguous squares is called a neighborhood of its central square. For example, in FIG. 11, the zone (1,2,3,5,6,7,9,10,11) is identified as the neighborhood of the square 6. When a vehicle enters a square, say, square 6, its IMU database receives the updated information required for optimal navigation in that particular square and in its neighborhood (1,2,3,5,6,7,9,10,11). This information is specific traffic load data pertaining to that neighborhood. It is grouped accordingly to all vehicles situated inside of that square at preset time intervals, say, each 15 minutes. If the updated data is different from the previously stored data, then the CTU database will automatically replace the old data and recalculate an alternate route. If so desired, the driver will be given an option to continue on the previous route (see display in FIG. 8, Unit 6). As a vehicle moves from square 6 to square 7, in FIG. 11, it receives the updated partial route related to square 7 and reflecting the traffic load within its new neighborhood (2,3,4,6,7,8,10,11,12). Thus, updating of the relevant traffic jam information is done only on the local zone basis.

Travel Times Data

Travel speeds along roads of various types (see FIG. 9) can be obtained from the maximum allowed travel speed and by multiplying it by corresponding speed coefficients, so that traveling along any particular road is assumed to be done with a speed pertinent to the type of that road. The resulting speeds will be called the theoretical speeds (see below), and the corresponding coefficients will be stored in a database in advance and provided on request. However, theoretical speeds are relevant only to ideal cases and will be probably never utilized except between midnight and early hours in the morning and even then under particularly favorably conditions. There are many reasons for this such as traffic congestion in rush hours, less than perfect road conditions, unfavorable weather conditions, falling trees, public gatherings, demonstrations, and probably a host of other factors that are difficult to enumerate.

The factors may be conveniently classified into three categories:

1. Generally stable changes in road conditions known in advance like closed roads under construction, traffic reroutes, changes in traffic arrangements because of visiting dignitaries, etc.;
2. Regular predictable changes like everyday slowdowns in rush hours;
3. Sudden unpredictable changes such traffic accidents, traffic congestion due to sudden and drastic changes in weather conditions, etc.

Factors in the first category may be usually dealt with by intervention of the human operator who can enter opening times and their duration manually in advance, and can provide for appropriate corrections into the database.

Figure 7:
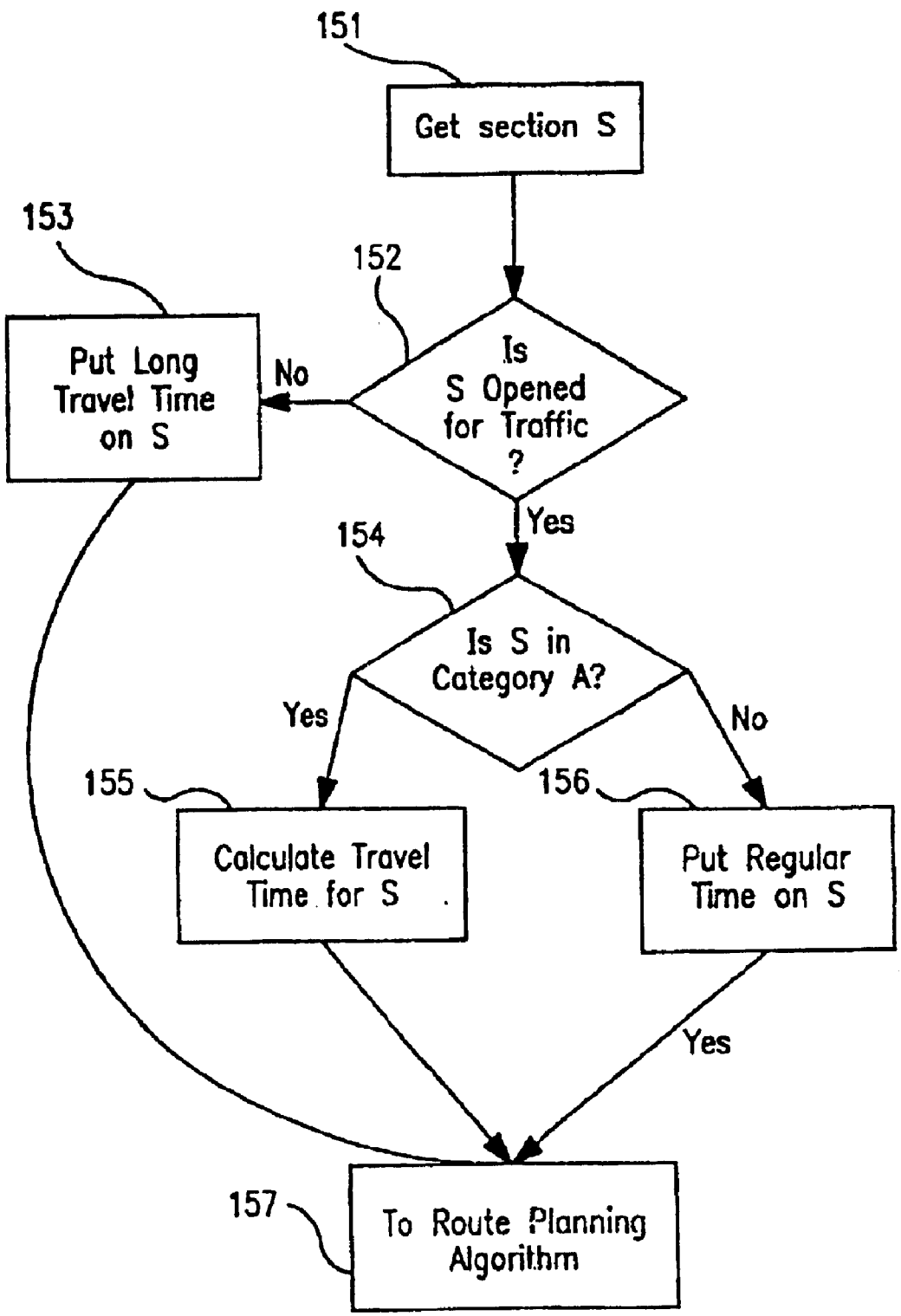
FIG. 7 is a section travel time managing algorithm.

FIG. 7 shows the Section Travel Time Managing Algorithm from Unit 135 in FIG. 6. Block 151: A section of the road for processing is received from Route-Planning Algorithm (Block 157 in FIG. 6). Block 152: If the section is opened for traffic, go to Block 154, otherwise in Block 153 a long travel time is put on it to make it unlikely to be selected for traveling by the route-planning algorithm. Block 154: If the section is in category A, calculate travel time for it in Block 155 (see FIG. 12 for details), otherwise use a regular travel time extracted from the database (Block 156). In Block 157, the calculated travel time on the section is sent to the route-planning algorithm (see Block 156 in FIG. 6).

Factors in the second category can probably be better accounted for busing statistical tools, i.e., by collecting statistics on travel times along particular roads or particular types of roads, at particular hours, at particular days of the week, etc. Being averages by necessity, those statistical or empirical travel times will nevertheless be much better approximations to reality than theoretical times often used in similar navigation systems. As the time passes by and enough statistics have been collected, the theoretical times are replaced by the corresponding empirical, i.e., statistical travel times based on which the corresponding empirical speed coefficients may be calculated and used instead of the theoretical speed coefficients (see calculation of empirical travel times in the section Regular Empirical Travel Times below).

As to factors in the third category, it appears that even empirical travel times may be unsuitable for describing traffic conditions arising from sudden and unexpected circumstances which might drastically influence traffic conditions, so that the present guidance system takes care of such eventualities by creating and updating special data structures associated with all roads in category A. Any slowdowns on those roads reflected in excessive travel times of vehicles are identified and stored in the database for a limited period of time and may be utilized if and when relevant (see FIG. 13 and the accompanying description in the section Current Travel Times.). This last feature provides the present invention with truly real time capabilities.

CTU Database

Figure 13:
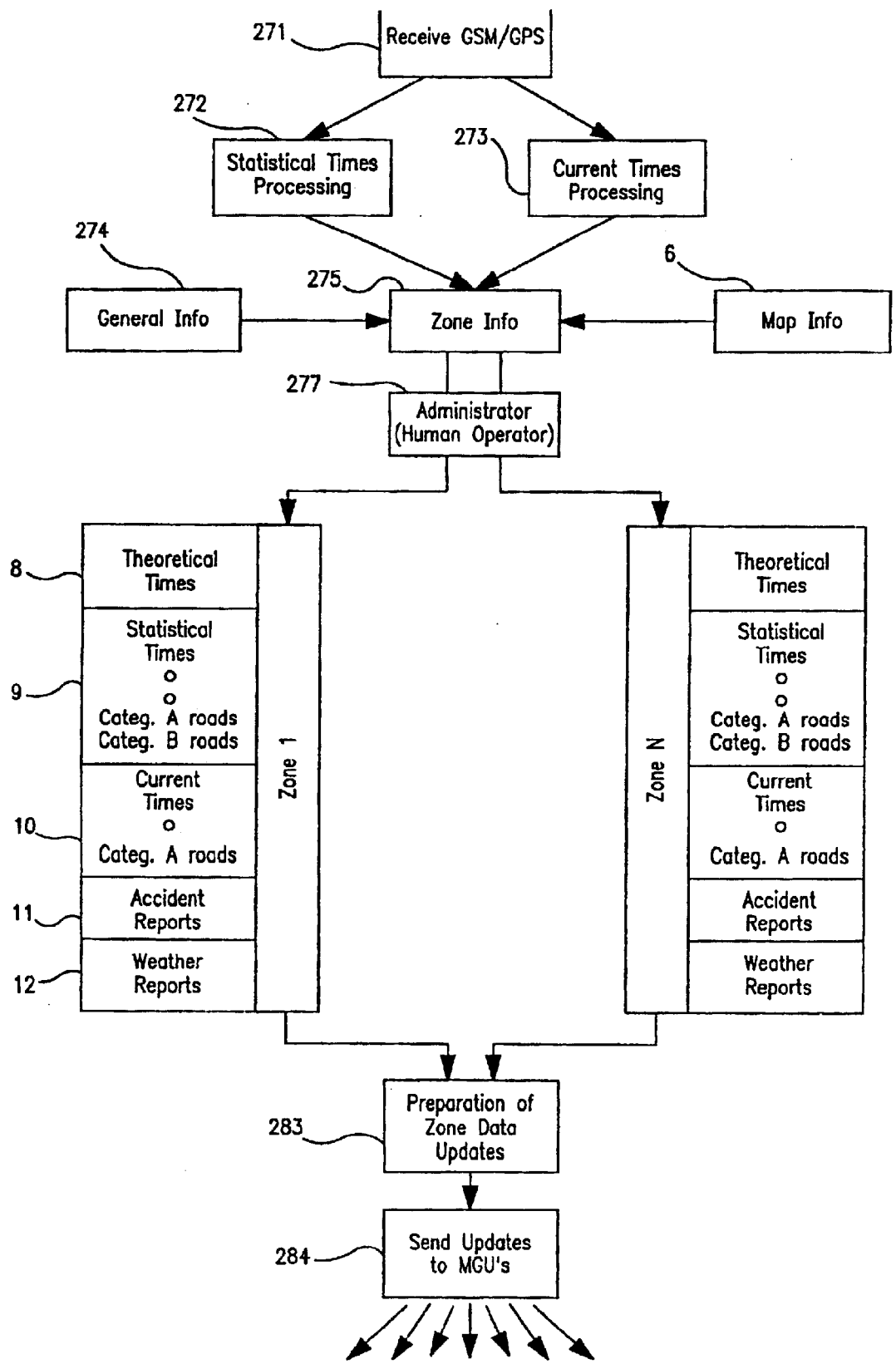
FIG. 13 shows the CTU database.

By utilizing GSM/GPS technology, or GSM technology, or other wireless technology, the CTU tracks the positions of MGUs and updates in real time the database of travel times for all roads. In response to a request from a driver for a route update from his present position to a desired destination, it calculates the desired fastest route by utilizing both the regular travel times along segments of roads and predicted current travel times found by using information collected from tracking routines. Thereafter, the route is communicated to the driver. FIG. 13 shows structured diagram of the CTU database and the corresponding information and control flows. The signals carrying GSM/GPS location information are received from vehicles (block 271) and are utilized for processing statistical database times (block 272) and current travel times (block 273). An important function of the CTU database is maintaining and updating geographical maps of all major and minor roads divided according to geographical zones (Units 5 and 6). The CTU database also stores all the data relevant to particular zones such as coordinates of their squares on the grid (block 274). In block 275 the travel time data is combined with geographical data, grouped according to geographical zones (numbered from 1 to N), and stored for future use. Intervention of human Administrator is possible at this stage (block 277). All information relevant to the roads such as distances, allowable speeds, traffic lights, traffic intersections, and traffic directions is also grouped according to geographical zones and stored in the CTU database. Everything associated with each particular zone is stored in the CTU database as one structure (Units 8–12): theoretical travel times, regular (statistical) travel times, the updated traffic data associated with category A roads and all necessary data for computation of current travel times, accident and weather reports. After new routes based on zone traffic updates have been prepared (block 283), they are sent to MGUs (block 284).

As said above, the present guidance system uses for route planning empirical statistical travel times instead of theoretical travel times. These empirical travel times are preserved in the form of empirical speed coefficients by which the maximum allowed speeds should be multiplied. Accordingly, another major part of the CTU database consists of a multidimensional table of speed coefficients (see FIG. 14 and FIG. 15 and more details in the section Regular Empirical Travel Times below).

The present guidance system can also account for rapid unpredictable changes in road conditions by maintaining special data structures associated with all category A sections that make it possible to store information such changes and use them for predicting fixture traffic conditions within a short time range. The key elements of those data structures ordered lists of travel times of the vehicles that have recently left the corresponding sections are maintained and permanently updated in the CTU database for calculations of real time optimal routes (see more details in the section Current Travel Times below).

Maximum Feasible Precision in Locating MGU Positions

For the present guidance system, a reasonable degree position accuracy for MGUs or cellphones is required. While the FCC wireless industry standards have mandated accuracy of 125 m in locating cellphone positions, the GSM network is still far from achieving this goal. For the purposes of the present invention, the most promising direction appears to be the combination of GPS-based methods together with GSM network base stations triangulation methods. GPS performs well in suburban and rural areas where there is unobstructed view of the sky and also in dense urban areas where there are severe multipath conditions due to the fact the GPS is a dynamic system with constantly moving satellites. In order to accommodate GPS in a handset, additional basic functions must be provided: 1. Antenna function, 2. Receiver function, 3. Processing function. At present, all these functions have already been incorporated in several cellphone models at some additional cost. For the present invention, it is estimated that 5% to 10% of vehicles equipped with GPS/GSM GSMs will be quite sufficient for accurate determination of traffic load patterns.

Theoretical Travel Times

At the initial period, the CTU provides for clients requesting travel time between their present position and their desired destination the theoretical travel times. Those Theoretical Travel Times (TTT) are valid only under ideal conditions and can be calculated by the formula $$TTT=L/V$$

where L is the length of the section S, and V is the maximal speed allowed on section S. Of course, for different types of roads the maximum speeds are different. Whenever possible, these theoretical travel times will be replaced by estimated empirical travel times as described below.

Regular Empirical Travel Times

Figure 14:
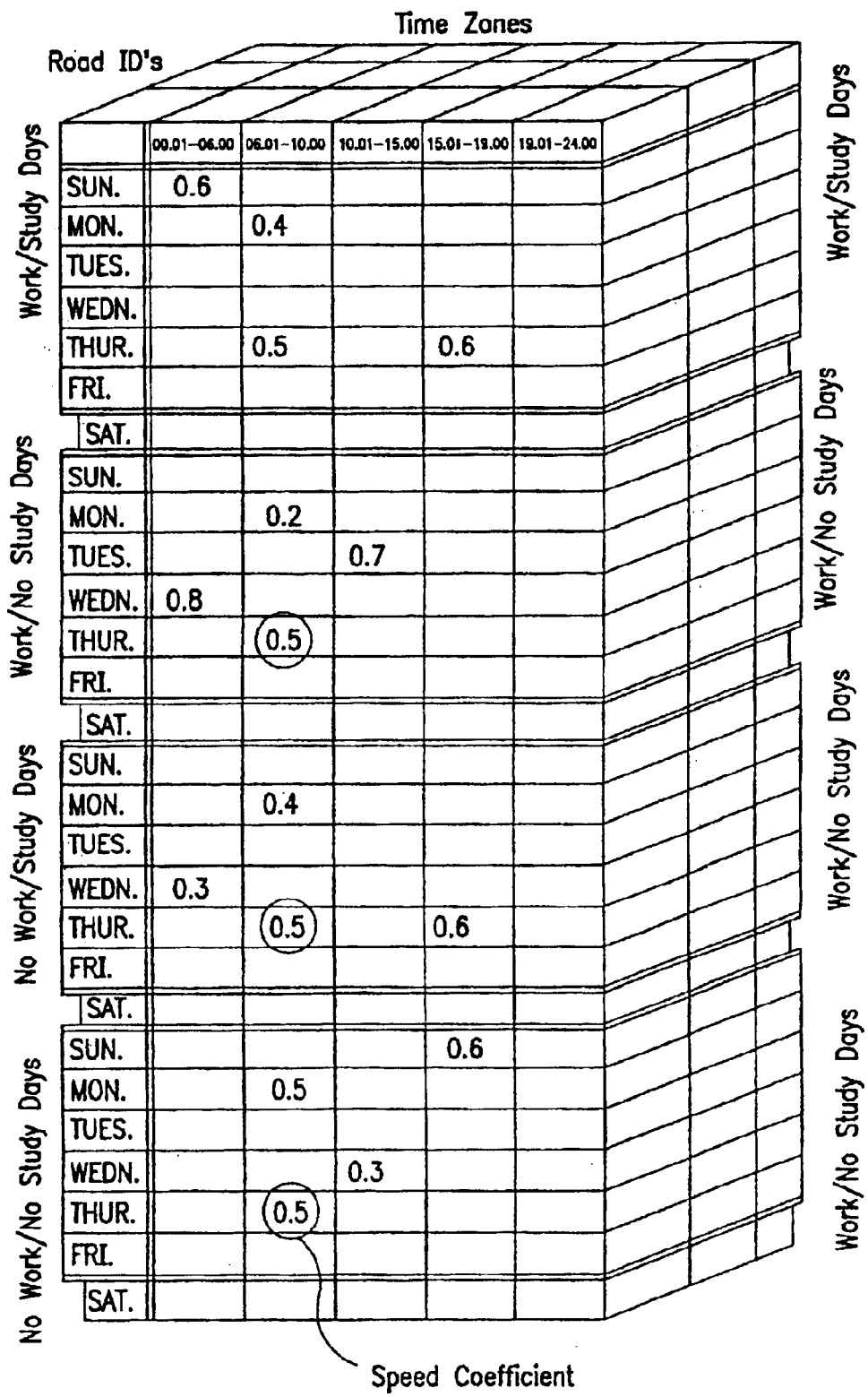
FIG. 14 is Table of administrator for Category A roads.
Figure 15:
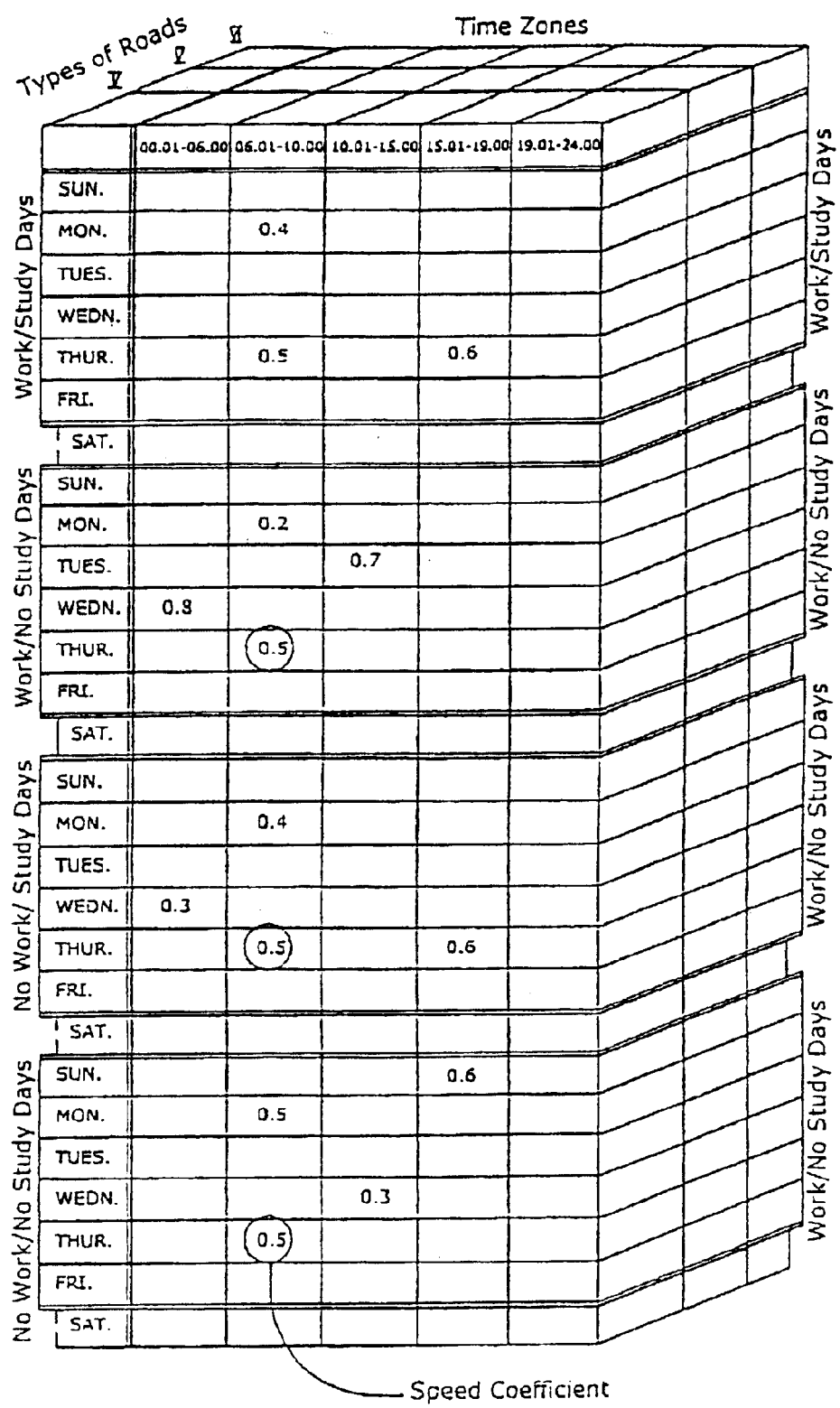
FIG. 15 is Table of administrator for Category B roads.
Figure 16:
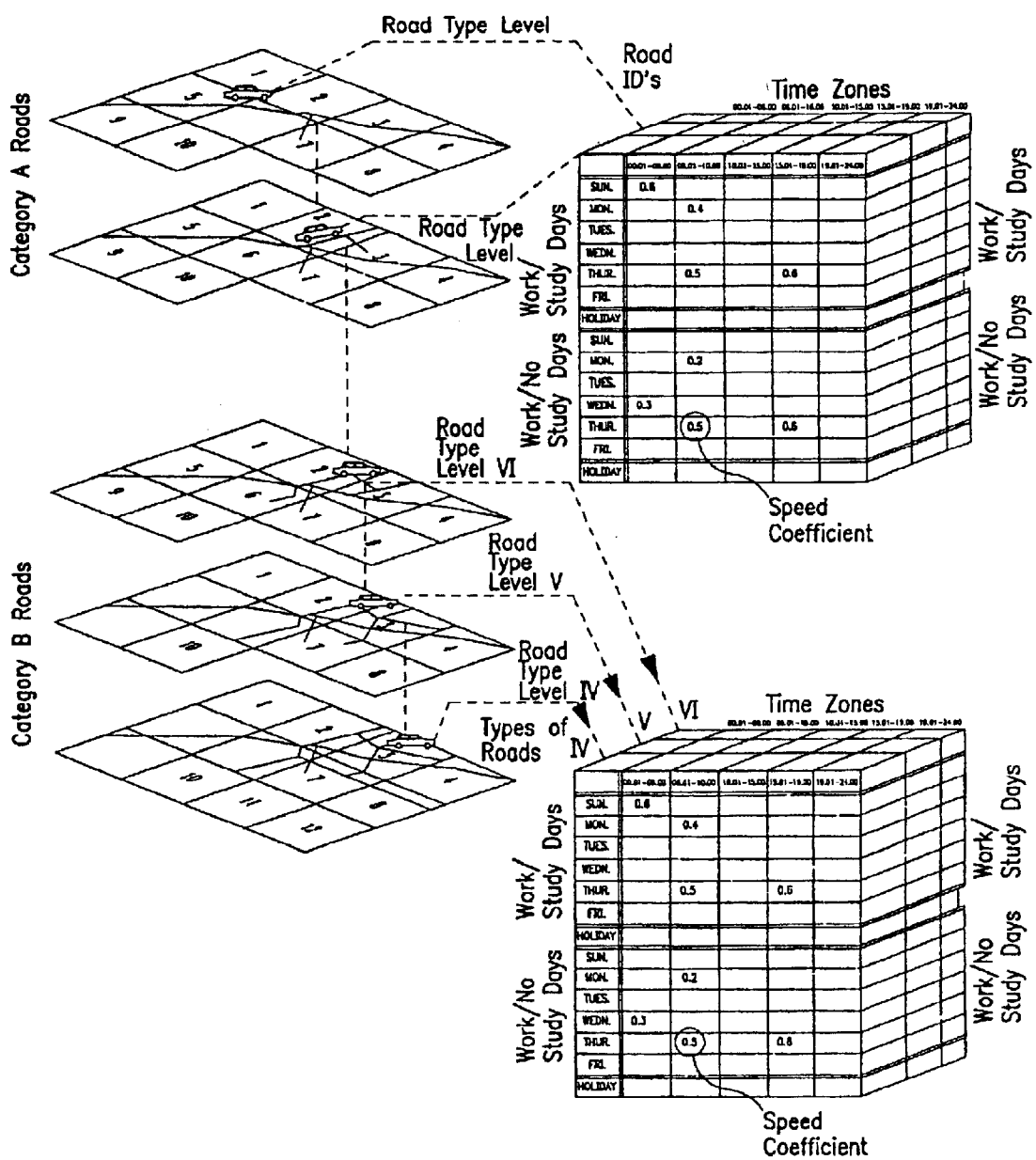
FIG. 16 shows the multilevel road information gathering system.

The CTU monitors all MGU vehicles and registers their travel times along a sample of sections of roads by processing their GSM/GPS signals. Thus obtained empirical, or regular, travel times are averaged, transformed into empirical speed coefficients and stored in the CTU database as attached to all sections of roads according to a number of categories: type of road, day of the week, month in the year (this may help to account for seasonal changes between summer and winter etc.), various combinations of working days or holidays, holidays for students and school pupils, time of the day. FIG. 14 and FIG. 15 called Tables of Administrator show the basic structure of this part of the CTU database. When sufficient data have been accumulated for accurate enough estimation of mean (regular empirical) travel times for each individual section in category A and for each class in category B, the CTU is able to provide those regular empirical travel times rather than theoretical travel times TTT (see FIG. 16).

Current Travel Times

As indicated above, the present guidance system makes real time monitoring of all roads in category A and stores thus obtained data in special data structures associated with those roads. Those data structures contain Exit Lists (EXL), i.e., actual travel times registered for a number of vehicles that have recently traveled along this section. EXLs of sections of roads are multicast at short time intervals from CTU to end-user databases and are available for use by their route-finding routines. How these EXLs are created and updated is described below whereas here we explain how they are used for route planning. When the section travel time managing algorithm (FIG. 7) needs to calculate the travel time for a section S in block 275, it calls the procedure shown in FIG. 12.

Figure 12:
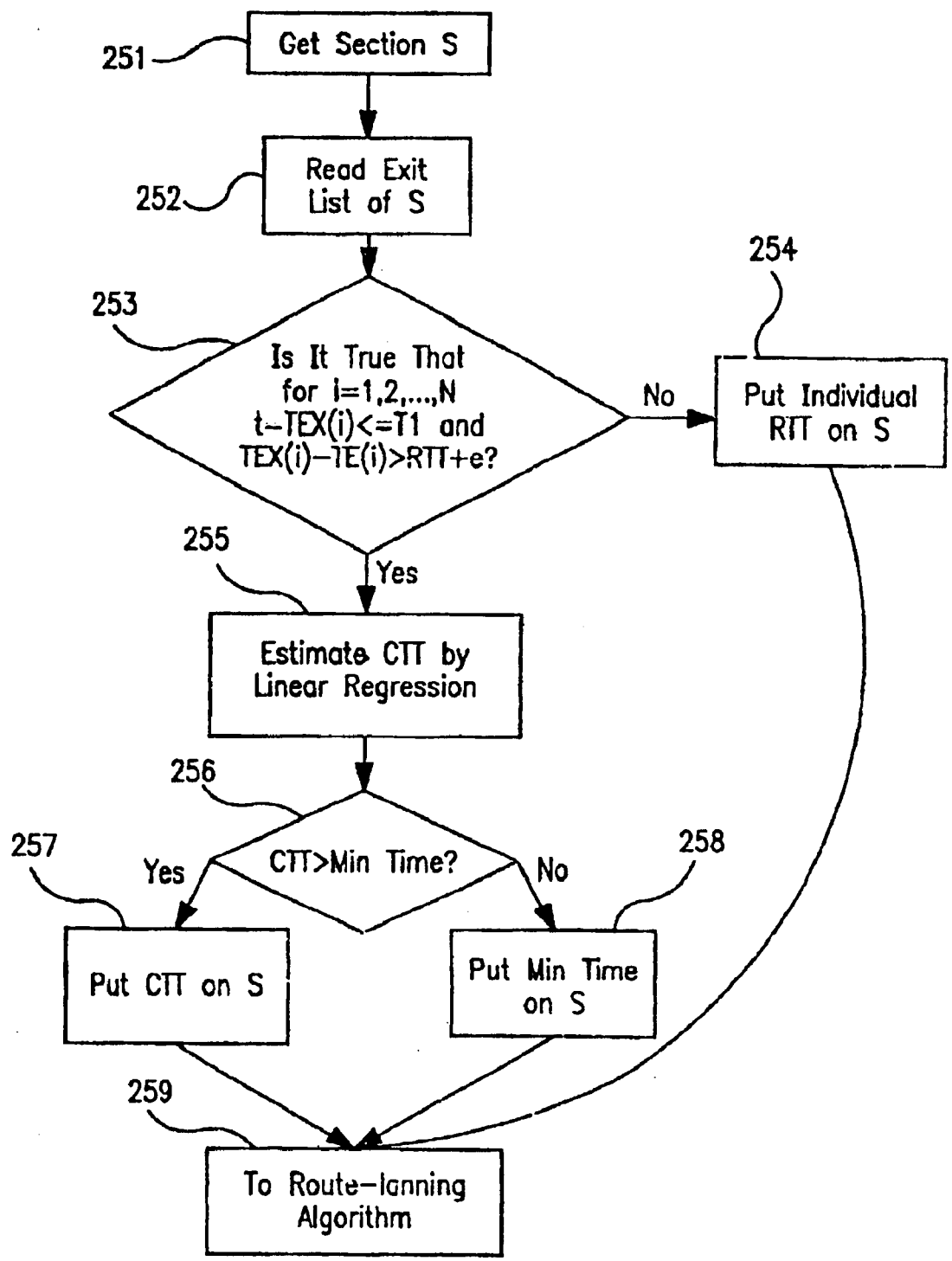
FIG. 12 shows calculations of travel times in Category A roads.

FIG. 12 describes calculations of travel times in category A roads. Block 251: Get a section S (in category A) to be processed. Block 252: Read the EXL associated with section S. Block 253: The goal here is to detect bottleneck situations, and to modify estimated Current Travel Time (CTT) accordingly. The criterion for using CTT rather than Regular Travel Times (RTT) for various sections is that EXL contains recent enough data. If 1) latest n vehicles on EXL have left section S within predetermined Time Interval (TI) (short enough to consider the detected bottleneck to be current), and 2) each of them has spent considerably more time on S than the corresponding RTT, then the situation can be interpreted as a bottleneck on the section S. Let t denote the time the vehicle under discussion is expected to commence traveling on S, TE(i) and TEX(i) the entry and exit times respectively for each vehicle V(i), i=1, 2, . . . , N, on the EXL, and the value e denotes a significant change between RTT and the observed travel time (say, e=10% of RTT).

Then for each vehicle V(i) on EXL we check two conditions:

1) $t-TEX(i)<=TI$ and 2) $TEX(i)-TE(i)>RTT+e$.

If all these 2n conditions are satisfied, the CTT is predicted by the linear regression technique (block 255), otherwise the RTT in the database is used in computations (block 254). Block 255: Since a bottleneck situation has been detected, the CTT is estimated as a predicted value at the time point t for the vehicle under discussion. This prediction is based on linear regression (see the regression-based prediction of current travel times below). Block 256: Here a check is made whether the regression estimated time is reasonably large, i.e., is greater than MinTime where MinTime is the shortest time needed for traveling on section S. If CTT is greater than MinTime, then CTT will be used in computations (block 257), otherwise the MinTime will be used (block 258). After the current travel time has been estimated in either block 254, or block 257, or block 258, the control is transferred to the route-planning algorithm in block 259.

Figure 17:
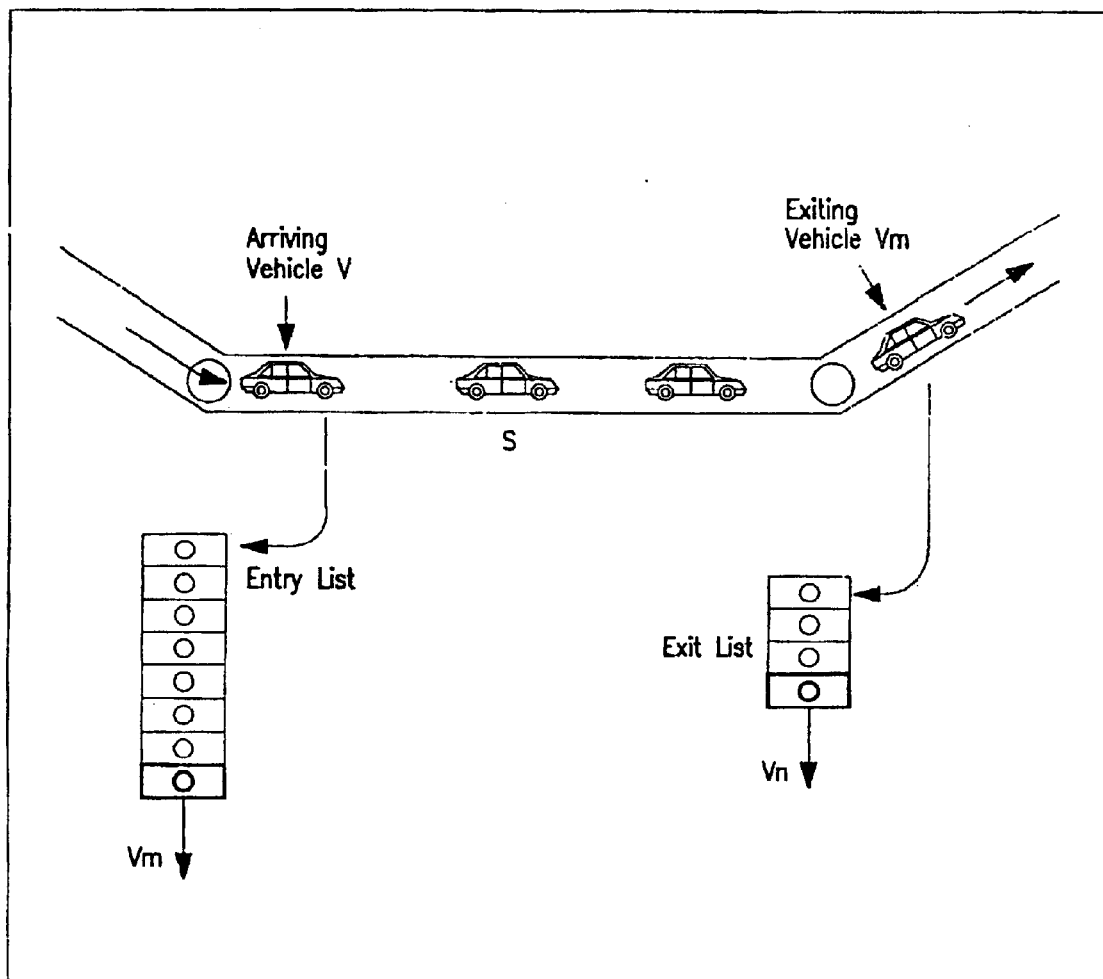
FIG. 17 shows the method for updating two lists of vehicles.

Now we describe the data structures associated with sections in category A. Each such data structure related to a particular section S consists of two lists of sample vehicles as shown in FIG. 17. The first list, Entry List (EL), contains all the sample vehicles presently traveling on this section of the road identified by their IDs together with their TEs. The second list, EXL, represents a queue of the latest n vehicles' TEXs (optionally, n is set equal to 3) that already left section S. The CTU stores their IDs together with their TEs and their TEXs. The two lists are updated as follows: When a vehicle enters section S, it is put on EL of S together with its TE. When a vehicle leaves S, it is removed from EL of S and is put last on EXL of S together with its TE and TEX. Simultaneously, the first vehicle in the queue is removed from EXL.

Figure 18:
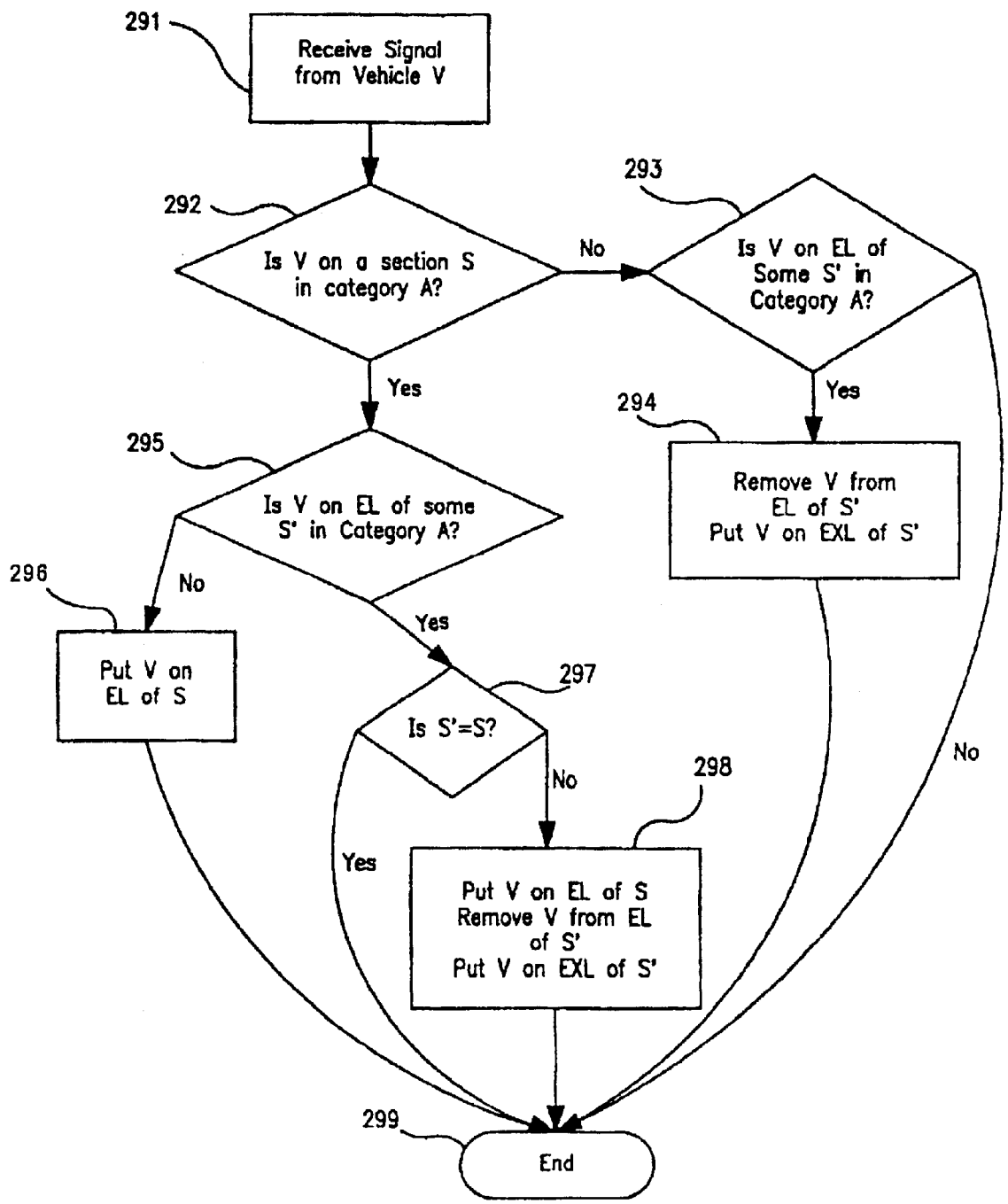
FIG. 18 is an algorithm for maintaining two lists of vehicles for Category A sections.

FIG. 18 presents the Algorithm for Maintaining Two Lists of Vehicles for Category A Sections. After receiving signal from a vehicle V in block 291, block 292 tests whether it is located on some section S in category A. If so, block 295 tests whether V has already been on the EL of some section S' in category A (which might be section S itself). If yes, it is tested whether S is identical to S' (block 297). If S is not identical to S', then the lists of both sections S and S' are updated accordingly in block 298. If, on the other hand, S is identical to S' which means that V continue traveling on S, then nothing should be done and the computations stop in block 299. In block 295, it is checked if V has not previously been on the EL of any section in category A (which means V has traveled along a category B section). V is then put on the EL of S in block 296.

Returning to block 292, if V is not on a category A section (which means that V is on a category B section), it is checked whether V has previously been on the EL of some section S' in category A (block 293). If yes, both lists of section S' are updated accordingly in block 294, and if no (which means that V has passed from a section in category B to a section in category B, or simply continues traveling along a category B section), the computation is discontinued (block 299).

The above construction might be inefficient for sections of considerable length for which traveling could take a long time. In such cases, considerable delays in measuring travel times could cause time estimates to be obsolete by the time they have been computed. Still, the described method can be amended (without attempting to measure vehicle speeds in traffic jams) as follows. A long section is cut into two artificial subsections and a dummy intersection is introduced between them. The two lists as described above are maintained in the database for each subsection. The traveling times for the subsections will be reduced by half, and more accurate estimates could be obtained.

Figure 19:
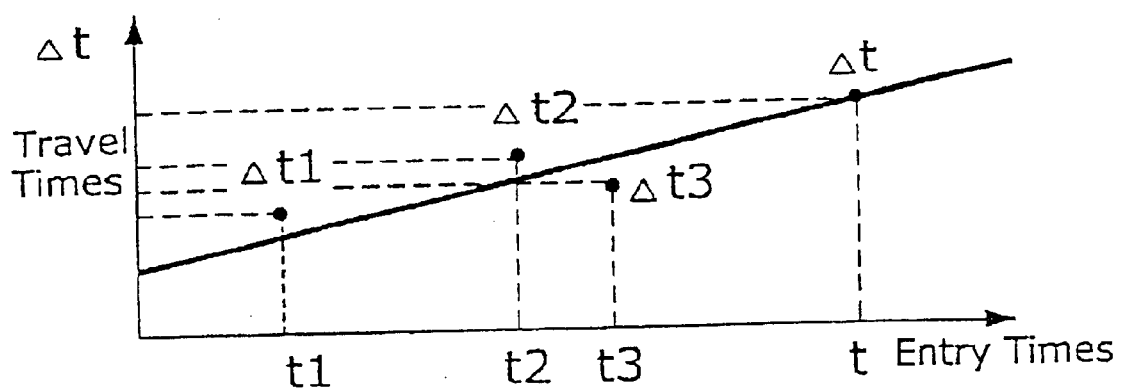
FIG. 19 illustrates regression-based prediction of current travel times.

Regression-Based Prediction of Current Travel Times presented in FIG. 19 is performed as follows:

Assume that the EXL contains n travel times t(1), t(2), . . . , t(n), and let TE(1), TE(2), . . . , TE(n) and TEX(1), TEX(2), . . . , TEX(n) be the corresponding entry times and exit times respectively, then $t(i)=TEX(i)-TE(i)$.

Also assume that the entry times are ordered increasingly:

$TE(1)<TE(2)<<TE(n)$.

Then compute a linear regression of the travel times t(1), t(2), . . . , t(n) on the entry times TE(1), TE(2), . . . , TE(n), and estimate the CTT t as a predicted value at point t.

Travel times measured on real vehicles may present bad data from statistical point of view because of gross measurement errors, possible outliers due to drivers's erratic behavior, etc. Therefore, it is preferable to use some form or robust regression for prediction purposes rather than linear regression.

Computation of Optimal Routes

Principally, search for optimal (shortest) route on a graph of roads could be done by using the algorithm A* developed in the field of Artificial Intelligence (Hart P. E., Nilsson N. J., and Raphael B. (1968). A Formal Basis for the Heuristic Determination of Minimum Cost Paths, IEEE Trans. Syst. Science and Cybernetics, SSC-4 (2), 100–107). For problems such as this one it is known to be superior to Dijkstra's algorithm often used for similar purposes.

Figure 20:
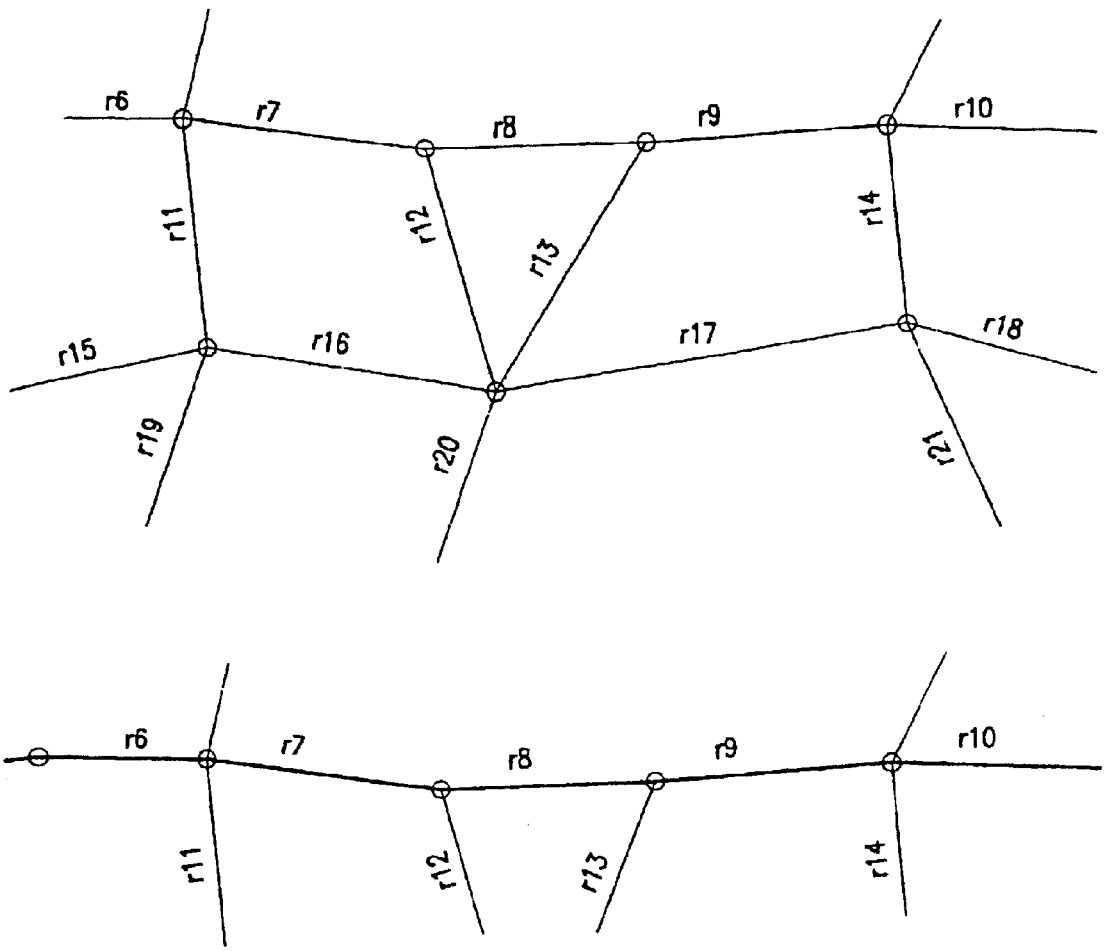
FIG. 20 illustrates the computation of optimal routes by Algorithm A*.

In the present invention, algorithm A* is applied to travel times not distances. As indicated above, when feasible, current travel times are being used as a basis for forecasting future travel times, see FIG. 20. Assume that the current section S being considered by algorithm A* is section r6. The (future) travel time r6 for S is to be predicted by the linear regression method based on the TEXs supplied by the latest three vehicles that traveled on r6 (see 1st table in FIG. 20).

Let TE(r6) be the entry time to section r6 for our vehicle V, and TEX(r6) its exit time for r6 predicted by linear regression. Then prediction of the travel time for V for section r7, say, is based on TEX(r6) as the TE for section r7 and the exit list EXL associated with section r7. This process is repeated for all sections that are being considered by algorithm A* until an optimal travel route and corresponding travel time have been calculated.

Still, due to enormous number of S sections of roads even in a moderately large geographical area (tens of thousands, hundreds of thousands, or even millions), more intelligent and domain-specific algorithm seems to be preferable. In particular, it appears that to simplify the search, a hierarchy of road layers should be created such as interstate and state highways at layer 1, national highways and major streets at layer 2, and local streets at layer 3.

In the present invention, we propose a new method for route planning called the algorithm Z. It utilizes stratification of road network into a hierarchy of layers, executes searches separately on each layer, and then combines the obtained results to produce a solution route, which leads to considerable reduction in search times.

For simplicity of presentation, assume that there are only two layers: upper layer containing large roads, say, interstate highways, and lower layer containing smaller roads, say, state roads. A search for optimal route begins by setting the origin and the destination points denoted by SP and DP respectively. First consider a case when both SP and DP are on large roads: see origin point SP=SP1 and destination point DP in FIG. 21. In this case the algorithm A* is run on the network of large roads, see FIG. 22, and the obtained solution (SP1, N4, N3, A, DP) is the desired route.

Figure 21:
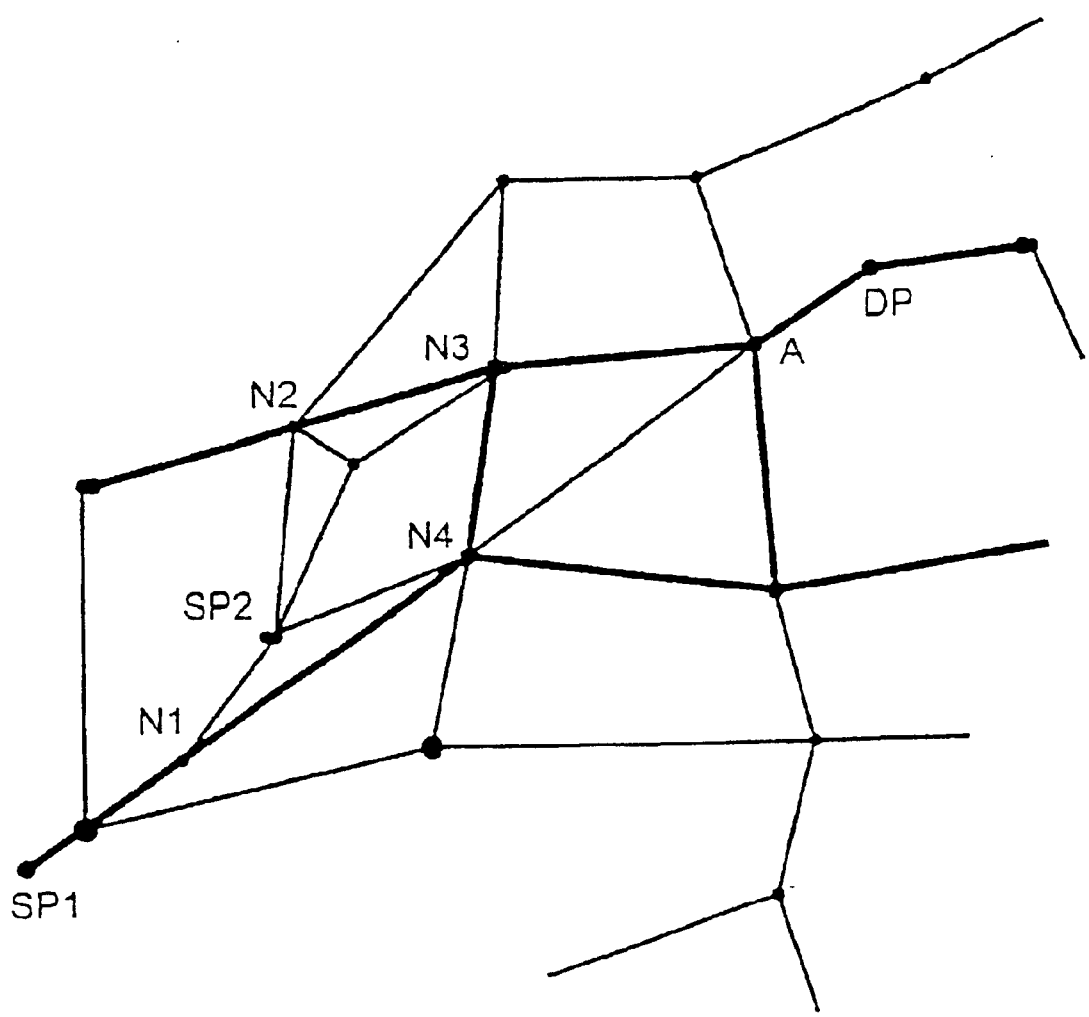
FIG. 21 shows Algorithm Z for planning routes in two-layer hierarchical model.
Figure 22:
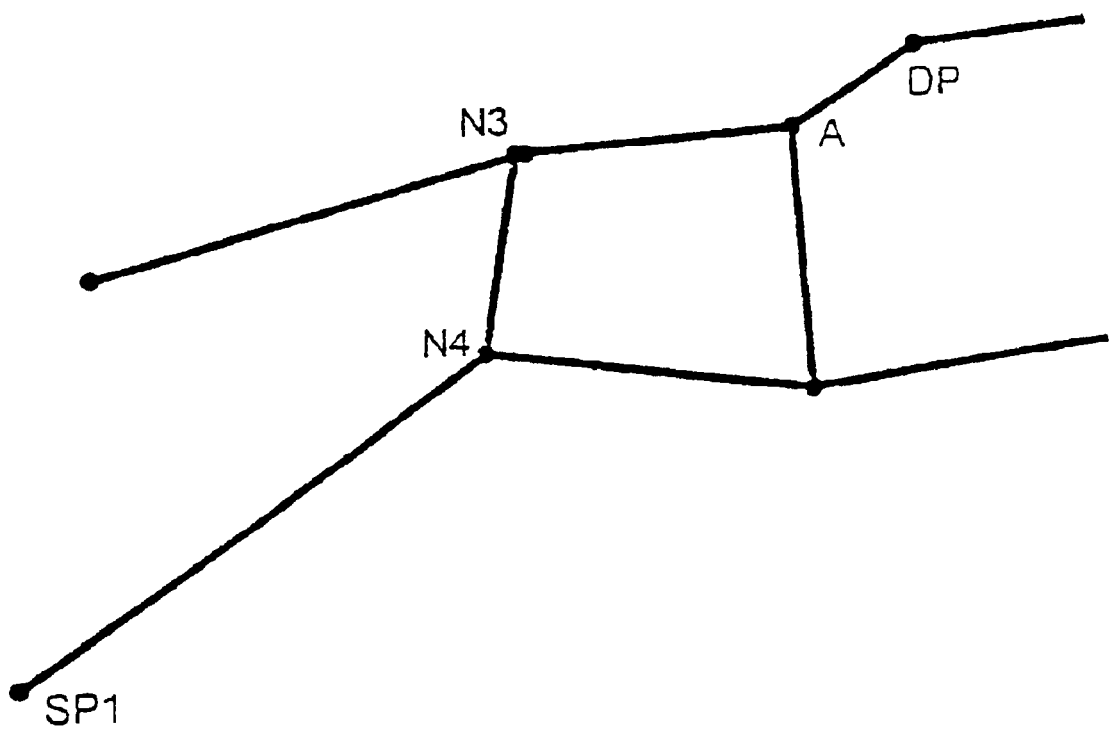
FIG. 22 shows Algorithm Z for planning routes at upper layer.

Now consider a case when at least one of the points SP or DP is not on a large road:
see the origin point SP=SP2 on a small road and the destination point DP on a large road in FIG. 21. Then a node N on a large road is called a neighbor of SP if the shortest path from SP to N consists of sections of small roads alone (no sections of large roads). In FIG. 21, the neighbors of SP2 are the four nodes N1, N2, N3 and N4.

Figure 23:
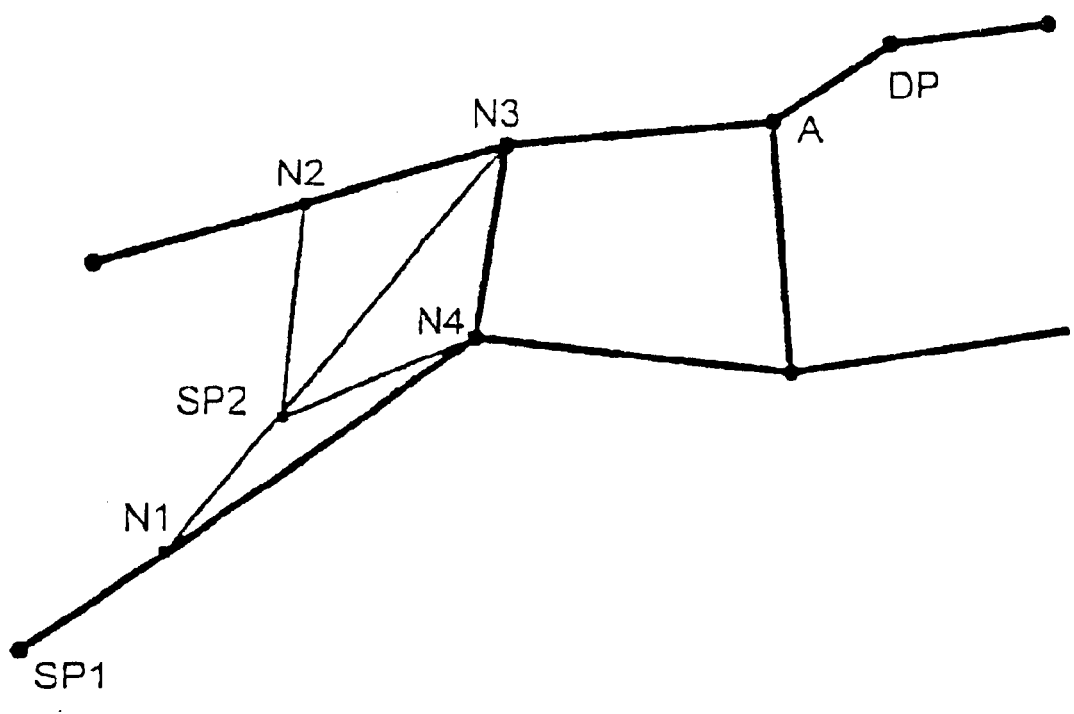
FIG. 23 shows Algorithm Z for planning routes at the extended road network.

For SP2 and each of its neighbors, we can construct a dummy arc with the length equal to the shortest path between them. These dummy arcs for all neighbors of SP are added to the network of large roads, which thereafter is called the extended network, see FIG. 23. These dummy arcs may or may not coincide with real sections on the map. For instance, the dummy arc (SP2, N3) in FIG. 23 does not coincide with any real section although its length is equal to the shortest path from SP2 to N3. Now running algorithm A* on the extended network, we obtain the shortest path (SP2, N3, A, DP) from SP2 to DP where (SP2, N3) is a dummy arc from SP to its neighbor N3, and (N3, A, DP) is a real path on the network of large roads. Finally, we replace the dummy arc (SP2, N3) by the corresponding shortest path from SP2 to N3 on small roads found by A* in a separate search, and combine the two paths to obtain the solution. The case when the destination point is not on a large road is treated similarly.

Figure 24:
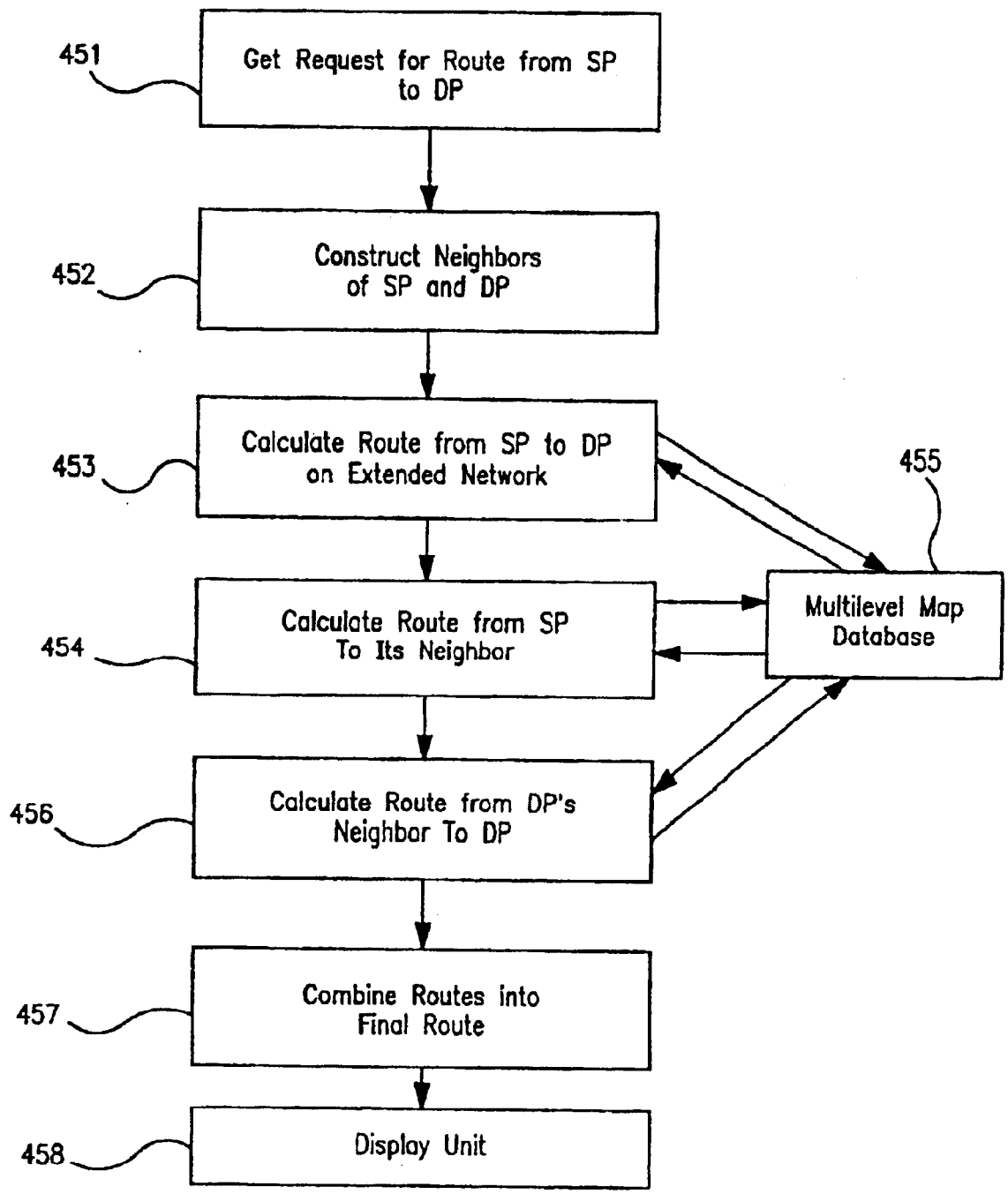
FIG. 24 is a flowchart of Algorithm Z for route planning.

FIG. 24 shows the flowchart of algorithm Z. A request for optimal route from the origin point SP to the destination point DP is received from the user in block 451. In block 452, the origin and destination points are checked to be located on large roads; if they do not, their neighbors are constructed and added to the network of large roads to make an extended network. In block 453, an optimal route from SP to DP is calculated on the extended network by algorithm A*. In so doing, the multilevel map database is queried for updated travel times (block 455). In block 454, an optimal route from SP to one of its neighbors is calculated by algorithm A* on the network of small roads. Similarly, in block 456, an optimal route from a neighbor of DP to DP is calculated. The obtained routes are combined into the final route in block 457, which is passed to the user in block 458.

The present invention may be readily extended to cases in which there are more than two layers of roads.

It is easy to construct mathematical examples when the above method may produce suboptimal solutions. In the example in FIG. 21, the passing by a small road from N4 to A has never been considered by algorithm Z. Still, it appears that for real maps such cases are extremely rare, and even when they happen, the losses of optimality will be negligible.

Entertainment and Security Related Applications

The MGU client could initiate queries to the CTU such as real time information on favorite restaurants, clubs, sports facilities etc., directly from CTU. Similarly, the driver may select A/V broadcast, lecture etc., available in the CTU broadcasting library. By using another transmission capability for GSM such as General Packet Radio Services (GPRS), MGUs can benefit from high-bandwidth data traffic without having to wait for the phone to dial, as they do with a circuit switched call. Full time connectivity is ideal for database access service and information transmission with Internet type networks based on TCP/IP protocol. This will enable operators to provide other services such as Internet WAP pages, advertisement announcements, and entertainment material at no additional cost.

GSM/GPS tracking capability of client vehicles MGUs individually could also enable various conventional security-related applications such as vehicle monitoring, warning and alarm systems and tracking applications without additional hardware additions or changes. As long as the cell phone is located in the vehicle receptacle, it can be monitored with interactive tracking/dispatcher application and its current GSM/GPS coordinates recorded without any user input. All position information can be accessed by the user via built-in functions such as cell phone's emergency location call (911). The guidance system can naturally access all vehicle location information anonymously and utilize it for development of real time traffic jam predictions.

Online Traffic Accidents and Weather Reports

In this refinement, the CTU database administrator can utilize most recent information on various traffic accidents and road disturbances reported by reliable sources. These are generally reported as static news items and presented in various formats. The administrator can enter these data directly into the CTU database together with the geographical location, time of the event, expected duration, etc. Similarly, the administrator can record all weather reports and road conditions as related to specific regions. These data can then be entered into the CTU database as related to specific zones together with other traffic data as a part of regional or zone traffic report.

In additional refinement, specific road disturbances such as road accidents or poor road conditions could also be entered automatically in real time into the CTU database after appropriate verification. The specific road sections where these accidents occurred would be updated automatically and new time coefficients temporarily altered according to a predetermined rating system. Once the road is cleared and report is verified, the original road ratings could be restored to previous status.

While the management of large amounts of temporary traffic data could be rather involved, the improvement of updating capabilities would be dramatic, especially in zones with large number of road incidents and frequent weather changes.

One embodiment of the invention can be used to provide statistical traffic reports and data collection of vehicle movements along federal, state, municipal and rural regional road networks. At present, these agencies rely mostly on extensive manpower resources as well as mechanical, electronical and optical installations for obtaining statistical traffic data. It is proposed here to use the travel time information obtained by MGU-equipped vehicles to enable studies of long-term traffic data and their accumulated effects on optimal traffic flows in specific geographical regions. For this application it would be useful to develop correlation between vehicle travel times on specific road section and the number of vehicles traveling in that road section at a given time period.

After slight changes, the application could classify and tabulate traffic data in each zone and produce daily, monthly and yearly traffic charts. The statistical traffic reports can then be made accessible to all the agencies mentioned above, as well as to public in general via electronic and other media.

Various modifications may be made to the preferred embodiments without departing from the invention. The inventive system may be readily extended to cases in which there are more than two layers of roads.

It is easy to construct mathematical examples when the suboptimal solutions are obtained. In the example in FIG. 21, the passing by a small road from N4 to A has never been considered by algorithm Z. Still, it appears that for real maps such cases are extremely rare, and even when they happen, the losses of optimality will be negligible.

The inventive system may further be useful for various other traffic analysis functions. Statistical information gathering for government road design and traffic planning agencies may be obtained. Such an arrangement would consist of statistical traffic reports and data collection of vehicle movements along federal, state, municipal and rural regional road networks. At present, these agencies rely mostly on extensive manpower resources as well as mechanical, electronic and optical installations for obtaining statistical traffic data. It is anticipated that the travel time information obtained by MGU-equipped vehicles will be used to enable studies of long-term traffic data and their accumulated effects on optimal traffic flows in specific geographical regions. For this application it would be useful to develop correlation between vehicle travel times on specific road section and the number of vehicles traveling in that road section at a given time period.

After slight changes, the application could classify and tabulate traffic data in each zone and produce daily, monthly and yearly traffic charts. The statistical traffic reports can then be made accessible to all the agencies mentioned above, as well as to public in general via electronic and other media.

What is claimed is:

1. A system for real time vehicle guidance and forecasting travel times within a predetermined travel region, the system comprising:

central traffic unit (CTU), mobile guidance units (MGU), and communication system (COS)

the COS providing wireless communications for communicating with client vehicles;

the CTU operatively connected to the communications system, the CTU performing a computed route search based on current and statistical section data;

a receiving device for collecting GPS data at predetermined time intervals from sample vehicles moving within the predetermined travel region, and operatively connected to the CTU;

said CTU operatively connected to the communications system capable of processing in real time said GPS data and transforming them into appropriately structured data;

a database suitable for storing and updating statistical data on traffic parameters on at least a limited number of individual roads as sensed by the sample vehicles;

computational tools for automatic identification of real time traffic jam conditions at various locations of the individual roads by utilizing the sample vehicles for measuring time delays; and the central traffic unit further comprising:

a map database containing digital road maps of a predetermined geographical region together with predetermined relevant data on road factors, including data on speed limits, road capacity, road intersections, and street directional designations;

a server for processing the location data received from MGUs and transforming them into structured data suitable for storage;

a database suitable for storing and updating statistical data on traffic parameters on at least a limited number of individual roads as sensed by the sample vehicles;

a table of administrator wherein said statistical data is further subdivided according to time into subdivisions;

statistical application for collecting said structured data, computing individual statistical travel time estimates for at least said limited number of individual roads, and storing the results in the table of administrator according to said subdivisions;

statistical application for collecting structured GPS data, computing individual statistical travel time estimates (regular times) for predetermined roads, and storing the results, the statistical application periodically updating the statistical data using statistical criteria for determining volumes of data necessary for obtaining valid and reliable estimates, the estimates having a predetermined validity;

computational tools for dividing said geographical region into a number of smaller geographical zones for reducing volumes of traffic parameter data broadcast to client vehicles;

software for calculation of said current travel times in traffic congestion based on said travel time traffic updates, thereby minimizing reliance on vehicle speed estimates, thereby increasing the reliability and stability of resulting statistical estimates; and software for calculation of fastest travel routes using said current travel time estimates in the zones contiguous to the vehicle while using statistical travel times in the zones situated further from the vehicle.

2. The system according to claim 1, further comprising:

the central traffic unit connected to telecommunications operator base stations and to the mobile guidance units via the communication system;

said central traffic unit utilizing wireless telephone technology for determination of location and for communication with MGUs via the communication system;

said central traffic unit utilizing the GPS location data, for achieving maximum feasible precision in determining MGU positions.

3. The system according to claim 1, further comprising:

the central traffic unit connected to telecommunications operator base stations and to the mobile guidance units via the communication system;

said central traffic unit utilizing wireless telephone technology and GPS equipment for communication with MGUs via the communication system;

said central traffic unit utilizing the GPS location data, for achieving maximum feasible precision in determining MGU positions; and one of said central processing unit and mobile guidance units applying an optimization procedure for computing an optimal route.

4. The system according to claim 1, wherein the central traffic unit further comprises:

the map database containing road category data; and guidance software based on mathematical and artificial intelligence algorithms together with the map databases for calculating fastest available travel routes from the present vehicle position to the desired destination while taking into account both statistical travel times and current travel time estimates.

5. A system for real time vehicle guidance and forcasting travel times within a predetermined travel region, the system comprising:
    central traffic unit (CTU)), mobile guidance units (MGU), and communication system (COS)
        the COS providing wireless communications for communicating with client vehicles;
    the CTU operatively connected to the communications system, the CTU performing a computed mute search based on current and statistical section data;
        a receiving device for collecting GPS data at predetermined time intervals from sample vehicles moving within the predetermined travel region, and operatively connected to the CTU;
        map database containing digital road maps of a predefined geographical region together with predetermined relevant data on road factors;
        said CTU operatively connected to the communications system capable of processing in real time said GPS data and transforming them into appropriately structured data;
        a database suitable for storing and updating statistical data on traffic parameters on individual roads as sensed by the sample vehicles;
        statistical application for collecting structured GPS data, computing individual statistical travel time estimates (regular times) for predetermined roads, and storing the results, the statistical application periodically updating the statistical data using statistical criteria for determining volumes of data necessary for obtaining valid and reliable estimates; and
        computational tools for automatic identification of real time traffic jam conditions at various locations of the individual roads by utilizing the sample vehicles for measuring time delays,
        wherein a plurality of the mobile guidance units further comprise:
            mobile unit with hybrid telecommunications and GPS capabilities connected to an existing mobile telecommunications network and utilizing a GPS receiver for accurate positioning;
            a mobile phone telematics protocol (MPTP) connection to a mobile telecommunications network server for real time position updates;
            a mounting receptacle for holding mobile cell phone handset unit;
            a sensor to identify when a mobile cell phone handset unit is located in the mounting receptacle;
            said mobile guidance units having a capability of accepting voice queries and transmit navigation commands; and
            said mobile guidance units containing computational units for storing route information and displaying it on the display unit.

6. A system for real time vehicle guidance and forecasting travel times within a predetermined travel region, the system comprising:
    central traffic unit (CTU), mobile guidance units (MGU), and communication system (COS)
        the COS providing wireless communications for communicating with client vehicles;
        the CTU operatively connected to the communications system, the CTU performing a computed route search based on current and statistical section data;
        a receiving device for collecting GPS data at predetermined time intervals from sample vehicles moving within the predetermined travel region, and operatively connected to the CTU;
        map database containing digital road maps of a predefined geographical region together with predetermined relevant data on road factors;
        said CTU operatively connected to the communications system capable of processing in real time said GPS data and transforming them into appropriately structured data;
        a database suitable for storing and updating statistical data on traffic parameters on individual roads as sensed by the sample vehicles;
        statistical application for collecting structured GPS data, computing individual statistical travel time estimates (regular times) for predetermined roads, and storing the results, the statistical application periodically updating the statistical data using statistical criteria for determining volumes of data necessary for obtaining valid and reliable estimates; and
        computational tools for automatic identification of real time traffic jam conditions at various locations of the individual roads by utilizing the sample vehicles for measuring time delays,
        the system utilizing wireless mobile telephone telecommunications for the purpose of providing reliable connection among the CTU, telecommunications operator stations, and MGUs wherein:
            said COS is capable of transmitting location data from MGUs to CTU via telecommunications service operator stations when relevant handset units are located in the client vehicles;
            said COS is capable of transmitting client requests from MGUs to CTU for a fastest route from a given location to a desired destination; and
            said COS is capable of transmitting appropriately coded information on calculated routes from CTU to MGUs for displaying it on the PC unit screen and communicating it by voice on the car navigational terminal.

7. A mobile unit for use with system which includes central traffic unit (CTU), mobile guidance units (MGU), and communication system (COS) for real time vehicle guidance and forecasting travel times, the mobile unit comprising:
    mobile unit with hybrid telecommunications and GPS capabilities connected to an existing mobile telecommunications network and utilizing a GPS receiver for accurate positioning, the mobile unit receiving data from a central traffic unit, the data including updated statistical data on traffic parameters of individual roads, the updated data including data for computing individual statistical travel time estimates as provided by sample vehicles;
    a mobile phone telematics protocol (MPTP) connection to a mobile telecommunications network server for real time position updates;
    a mounting receptacle for holding mobile cell phone handset unit;
    a sensor to identify when a mobile cell phone handset unit is located in the mounting receptacle;
    said mobile guidance units having a capability of accepting voice queries and transmit navigation commands; and
    said mobile guidance units containing computational units, the computational units capable of storing route information and displaying it on the display unit.

8. The system according to claim 7, further comprising:
    the central traffic unit connected to telecommunications operator base stations and to the mobile guidance units via the communication system;

said central traffic unit utilizing wireless telephone technology for determination of location and for communication with MGUs via the communication system;

said central traffic unit utilizing the GPS location data, for achieving maximum feasible precision in determining MGU positions.

9. The system according to claim 7, further comprising:

the central traffic unit connected to telecommunications operator base stations and to the mobile guidance units via the communication system;

said central traffic unit utilizing wireless telephone technology and GPS equipment for communication with MGUs via the communication system;

said central traffic unit utilizing the GPS location data, for achieving maximum feasible precision in determining MGU positions.

10. The system according to claim 9, wherein the central traffic unit further comprises:

the map database containing road category data; and guidance software based on mathematical and artificial intelligence algorithms together with the map databases for calculating fastest available travel routes from the present vehicle position to the desired destination while taking into account both statistical travel times and current travel time estimates.

11. The system according to claim 7, wherein the central traffic unit further comprises:

a map database containing digital road maps of a predetermined geographical region, data on speed limits, road capacity, road intersections, and street directional designations;

a server for processing the location data received from MGUs and transforming them into structured data suitable for storage;

a database suitable for storing and updating statistical data on traffic parameters at least on a limited number of individual roads;

a table of administrator wherein said statistical data is further subdivided according to time into subdivisions;

statistical application for collecting said structured data, computing individual statistical time travel estimates for at least said limited number of individual roads, and storing the results in the table of administrator according to said subdivisions;

statistical application for periodical updating of said statistical data using statistical criteria for determining volumes of data required for obtaining estimates of a predetermined validity;

computational tools for dividing said geographical region into a number of smaller geographical zones for reducing volumes of traffic parameter data broadcast to client vehicles;

software for calculation of said current travel times in traffic congestion based on said travel time traffic updates, thereby minimizing reliance on vehicle speed estimates, thereby increasing the reliability and stability of resulting statistical estimates;

software for calculation of fastest travel routes using said current travel time estimates in the zones contiguous to the vehicle while using statistical travel times in the zones situated further from the vehicle.

12. The system according to claim 7, utilizing wireless mobile telephone telecommunications for the purpose of providing reliable connection among the CTU, telecommunications operator stations, and MGUs wherein:

said COS is capable of transmitting location data from MGUs to CTU via telecommunications service operator stations when relevant handset units are located in the mounting receptacles;

said COS is capable of transmitting client requests from MGUs to CTU for a fastest route from a given location to a desired destination; and said COS is capable of transmitting appropriately coded information on calculated routes from CTU to MGUs for displaying it on the PC unit screen and communicating it by voice on the car navigational terminal.

13. A method for real time vehicle guidance and forecasting travel times, the method comprising:

providing central traffic unit (CTU), mobile guidance units (MGU), and communication system (COS) for wireless communication with client vehicles and operatively connected to the CTU;

connecting the central traffic unit to telecommunications operator base stations and to the mobile guidance units via the communication system;

using said central traffic unit for determination of location and for communication with MGUs via the communication system by utilizing wireless telephone technology;

receiving and collecting GPS data at predetermined time intervals from sample vehicles moving within a predetermined travel region;

using said central traffic unit and the GPS location data, and processing in real time said GPS data and transforming them into appropriately structured data for achieving maximum feasible precision in determining MGU positions;

storing road category data in the map database;

utilizing the data from the sample vehicles for automatic identification of real time traffic jam conditions at various locations of the individual roads by utilizing the sample vehicles for measuring time delays and computing travel time estimates;

using mathematical and artificial intelligence algorithms together with the map databases for calculating fastest available travel routes from the present vehicle position to the desired destination while taking into account both statistical travel times and current travel time estimates; and applying an optimization procedure for computing an optimal route.

14. Method according to claim 13, further comprising:

the central traffic unit connected to telecommunications operator base stations and to the mobile guidance units via the communication system;

utilizing wireless telephone technology and GPS equipment for communication with MGUs via the communication system;

utilizing the GPS location data, for achieving maximum feasible precision in determining MGU positions.

15. Method according to claim 13, further comprising:

using information gathered by the CTU for developing statistical traffic data and data collection of vehicle movements along federal, state, municipal and rural regional road networks, including developing a database of long-term traffic data and their accumulated effects on optimal traffic flows in specific geographical regions.

16. A method for real time vehicle guidance and forecasting travel times, the method comprising:
  providing central traffic unit (CTU), mobile guidance units (MGU), and communication system (COS) for wireless communication with client vehicles and operatively connected to the CTU;
  connecting the central traffic unit to telecommunications operator base stations and to the mobile guidance units via the communication system;
  using said central traffic unit for determination of location and for communication with MGUs via the communication system by utilizing wireless telephone technology;
  receiving and collecting GPS data at predetermined time intervals from sample vehicles moving within a predetermined travel region;
  using said central traffic unit and the GPS location data, and processing in real time said GPS data and transforming them into appropriately structured data for achieving maximum feasible precision in determining MGU positions;
  providing a map database containing digital road maps of a predetermined geographical region, together with predetermined relevant data on road factors including, data on speed limits, road capacity, road intersections, and street directional designations;
  processing the location data received from MGUs and transforming them into structured data suitable for storage;
  storing and updating statistical data on traffic parameters at least on a limited number of individual roads;
  further subdividing said statistical data according to time into subdivisions;
  collecting said structured data, using the structured data to compute individual statistical time travel estimates for at least said limited number of individual roads, and storing the results according to said subdivisions;
  periodically updating said statistical data using statistical criteria for determining volumes of data required for obtaining estimates of a predetermined validity;
  dividing said geographical region into a number of smaller geographical zones for reducing volumes of traffic parameter data broadcast to client vehicles;
  calculating said current travel times in traffic congestion based on said travel time traffic updates, thereby minimizing reliance on vehicle speed estimates, thereby increasing the reliability and stability of resulting statistical estimates;
  calculating fastest travel routes using said current travel time estimates in the zones contiguous to the vehicle while using statistical travel times in the zones situated further from the vehicle; and
  applying an optimization procedure for computing an optimal route.

17. A method for real time vehicle guidance and forecasting travel times, the method comprising:
  providing central traffic unit (CTU), mobile guidance units (MGU), and communication system (COS) for wireless communication with client vehicles and operatively connected to the CTU;
  connecting the central traffic unit to telecommunications operator base stations and to the mobile guidance units via the communication system;
  using said central traffic unit for determination of location and for communication with MGUs via the communication system by utilizing wireless telephone technology;
  receiving and collecting GPS data at predetermined time intervals from sample vehicles moving within a predetermined travel region;
  using said central traffic unit and the GPS location data, and processing in real time said GPS data and transforming them into appropriately structured data for achieving maximum feasible precision in determining MGU positions;
  providing a plurality of mobile unit with hybrid telecommunications and GPS capabilities connected to an existing mobile telecommunications network and utilizing a GPS receiver for accurate positioning;
  using a mobile phone telematics protocol (MPTP) connection to a mobile telecommunications network server for real time position updates;
  using said mobile guidance units to accept voice queries and transmit navigation commands; and
  storing route information and displaying said route information in display units associated with said mobile units.

18. Method according to claim 17, further comprising using information gathered by the CTU for developing statistical traffic data.

19. Method according to claim 17, further comprising:
  the central traffic unit connected to telecommunications operator base stations and to the mobile guidance units via the communication system;
  utilizing wireless telephone technology and GPS equipment for communication with MGUs via the communication system;
  utilizing the GPS location data, for achieving maximum feasible precision in determining MGU positions.

20. Method according to claim 17, further comprising:
  using information gathered by the CTU for developing statistical traffic data and data collection of vehicle movements along federal, state, municipal and rural regional road networks, including developing a database of long-term traffic data and their accumulated effects on optimal traffic flows in specific geographical regions.

21. A method for real time vehicle guidance and forecasting travel times, the method comprising:
  providing central traffic unit (CTU), mobile guidance units (MGU), and communication system (COS) for wireless communication with client vehicles and operatively connected to the CTU;
  connecting the central traffic unit to telecommunications operator base stations and to the mobile guidance units via the communication system;
  using said central traffic unit for determination of location and for communication with MGUs via the communication system by utilizing wireless telephone technology;
  receiving and collecting GPS data at predetermined time intervals from sample vehicles moving within a predetermined travel region;
  using said central traffic unit and the GPS location data, and processing in real time said GPS data and transforming them into appropriately structured data for achieving maximum feasible precision in determining MGU positions; and
  utilizing wireless mobile telephone telecommunications for the purpose of providing reliable connection among the CTU, telecommunications operator stations, and MGUs wherein:

said COS is used to transmit location data from MGUs to CTU via telecommunications service operator stations when relevant handset units are located in mounting receptacles;

said COS is used to transmit client requests from MGUs to CTU for a fastest route from a given location to a desired destination; and said COS is used to transmit appropriately coded information on calculated routes from CTU to MGUs for displaying it on the PC unit screen and communicating it by voice on the car navigational terminal.

* * * * *

(12) INTER PARTES REVIEW CERTIFICATE (1711th)
United States Patent  (10) Number: US 6,615,130 K1
Myr  (45) Certificate Issued: Mar. 17, 2020

(54) REAL TIME VEHICLE GUIDANCE AND TRAFFIC FORECASTING SYSTEM

(75) Inventor: David Myr

(73) Assignee: MAKOR ISSUES AND RIGHTS LTD.

Trial Numbers:

IPR2016-01536 filed Aug. 5, 2016
IPR2016-01537 filed Aug. 5, 2016
IPR2017-00818 filed Feb. 2, 2017

Inter Partes Review Certificate for:

Patent No.: 6,615,130
Issued: Sep. 2, 2003
Appl. No.: 09/800,116
Filed: Mar. 6, 2001

The results of IPR2016-01536 and IPR2016-01537, and IPR2017-00818 are reflected in this inter partes review certificate under 35 U.S.C. 318(b).

INTER PARTES REVIEW CERTIFICATE
U.S. Patent 6,615,130 K1
Trial No. IPR2016-01536
Certificate Issued Mar. 17, 2020

AS A RESULT OF THE INTER PARTES REVIEW PROCEEDING, IT HAS BEEN DETERMINED THAT:

Claims 1-4 and 6 are cancelled.

\* \* \* \* \*